US011412254B2

(12) United States Patent
Tsukagoshi

(10) Patent No.: US 11,412,254 B2
(45) Date of Patent: *Aug. 9, 2022

(54) TRANSMISSION DEVICE, TRANSMISSION METHOD, RECEPTION DEVICE AND RECEPTION METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/161,164

(22) Filed: Jan. 28, 2021

(65) Prior Publication Data

US 2021/0152847 A1 May 20, 2021

Related U.S. Application Data

(63) Continuation of application No. 15/750,300, filed as application No. PCT/JP2016/073543 on Aug. 10, 2016, now Pat. No. 10,951,915.

(30) Foreign Application Priority Data

Aug. 19, 2015 (JP) ............................ JP2015-161966

(51) Int. Cl.

*H04N 19/587* (2014.01)
*H04N 19/70* (2014.01)
*H04N 7/01* (2006.01)
*H04N 19/31* (2014.01)
*H04N 19/132* (2014.01)
*H04N 19/187* (2014.01)

(52) U.S. Cl.

CPC ............. *H04N 19/587* (2014.11); *H04N 7/01* (2013.01); *H04N 19/132* (2014.11); (Continued)

(58) Field of Classification Search

CPC ........ H04N 19/587; H04N 7/01; H04N 19/31; H04N 19/132; H04N 19/187; H04N 19/70;

(Continued)

(56) References Cited

U.S. PATENT DOCUMENTS

2004/0036800 A1 * 2/2004 Ohki .................... H04N 19/187 375/E7.254
2008/0303941 A1 12/2008 Ohki (Continued)

FOREIGN PATENT DOCUMENTS

CN 101584220 A 11/2009
CN 102905200 A 1/2013

(Continued)

OTHER PUBLICATIONS

International Search Report dated Nov. 15, 2016 in PCT/JP2016/073543 filed Aug. 10, 2016.

*Primary Examiner* — Richard A Hansell, Jr.

(74) *Attorney, Agent, or Firm* — Oblon, McClelland, Maier & Neustadt, L.L.P.

(57) ABSTRACT

High frame rate moving image data is satisfactorily transmitted.

Mixing processing is performed in units of two temporally consecutive pictures in predetermined frame rate image data, and base frame rate image data is obtained. Image data of one picture in units of the two temporally consecutive pictures is extracted, and high frame rate enhanced frame image data is obtained. Prediction encoding processing of base frame rate image data is performed to the base frame rate image data, and a base stream is obtained. Prediction encoding processing with respect to the base frame rate image data is performed to the high frame rate enhanced frame image data, and an enhanced stream is obtained. A predetermined format container is transmitted including the base stream and the enhanced stream.

16 Claims, 17 Drawing Sheets

(52) U.S. Cl.
CPC ........... *H04N 19/187* (2014.11); *H04N 19/31* (2014.11); *H04N 19/70* (2014.11)

(58) Field of Classification Search
CPC ......... H04N 19/172; H04N 21/234327; H04N 21/23605
See application file for complete search history.

(56) References Cited

U.S. PATENT DOCUMENTS

| | | | | |
|---|---|---|---|---|
| 2009/0097548 | A1* | 4/2009 | Karczewicz | H04N 19/93 375/240.03 |
| 2013/0308049 | A1 | 11/2013 | Ohki | |
| 2014/0104492 | A1* | 4/2014 | Liu | H04N 19/30 348/387.1 |
| 2015/0195566 | A1* | 7/2015 | Hinz | H04N 19/157 375/240.12 |
| 2015/0195581 | A1* | 7/2015 | Lee | H04N 19/11 375/240.27 |
| 2016/0234500 | A1 | 8/2016 | Tsukagoshi | |

FOREIGN PATENT DOCUMENTS

| | | | |
|---|---|---|---|
| JP | 2004-88244 | A | 3/2004 |
| JP | 2006-333071 | A | 12/2006 |
| JP | 2007-28034 | A | 2/2007 |
| JP | 2009/225431 | | 10/2009 |
| WO | 2015/076277 | A1 | 5/2015 |

* cited by examiner

| Syntax | No. of Bits | Format |
|---|---|---|
| Layer_prediction_mapping_SEI ( ) { | | |
| Layer_prediction_mapping_id | 16 | uimsbf |
| Layer_prediction_mapping_length | 8 | uimsbf |
| number_of_coef | 8 | uimsbf |
| for (i = 0; i < number_of_coef; i++) { | | |
| prediction_coef[i] | 8 | uimsbf |
| } | | |
| } | | |

(b)

| | |
|---|---|
| Number_of_coef(8bits) | NUMBER OF COEFFICIENTS TO MULTIPLY PREDICTION TARGET IN layer PREDICTION |
| prediction_coef(8bits) | VALUE OF COEFFICIENT TO MULTIPLY PREDICTION TARGET IN layer PREDICTION |
| 0x00 | 1.00 |
| 0x01 | 0.25 |
| 0x02 | 0.50 |
| 0x03 | 0.75 |
| 0x04 | 2.00 |
| 0x05 | 1.25 |
| 0x06 | 1.50 |
| 0x07 | 1.75 |

| Syntax | No. of Bits | Format |
|---|---|---|
| Layer_prediction_mapping_descriptor ( ) { | | |
| Layer_prediction_mapping_descriptor_tag | 8 | uimsbf |
| Layer_prediction_mapping_descriptor_length | 8 | uimsbf |
| number_of_coef | 8 | uimsbf |
| for (i = 0; i < number_of_coef; i++) { | | |
| prediction_coef[i] | 8 | uimsbf |
| } | | |
| } | | |

(b)

| | |
|---|---|
| Number_of_coef(8bits) | NUMBER OF COEFFICIENTS TO MULTIPLY PREDICTION TARGET IN layer PREDICTION |
| prediction_coef(8bits) | VALUE OF COEFFICIENT TO MULTIPLY PREDICTION TARGET IN layer PREDICTION |
| 0x00 | 1.00 |
| 0x01 | 0.25 |
| 0x02 | 0.50 |
| 0x03 | 0.75 |
| 0x04 | 2.00 |
| 0x05 | 1.25 |
| 0x06 | 1.50 |
| 0x07 | 1.75 |

FIG. 16

(1) A CASE WHERE MIXING PROCESSING IS NOT PERFORMED

*B*

| | | | |
|---|---|---|---|
| 77 | 79 | 79 | 75 |
| 74 | 81 | 89 | 99 |
| 79 | 86 | 86 | 90 |
| 69 | 78 | 79 | 88 |

Original (N+1) th frame block

−

*A*

| | | | |
|---|---|---|---|
| 68 | 71 | 80 | 83 |
| 66 | 63 | 79 | 97 |
| 76 | 84 | 90 | 94 |
| 57 | 61 | 73 | 78 |

Original Nth frame block

=

*B - A*

| | | | |
|---|---|---|---|
| 9 | 8 | -1 | -8 |
| 8 | 18 | 10 | 2 |
| 3 | 2 | -4 | -4 |
| 12 | 17 | 6 | 10 |

Residual data 1

(2) A CASE WHERE MIXING PROCESSING IS PERFORMED

*B*

| | | | |
|---|---|---|---|
| 77 | 79 | 79 | 75 |
| 74 | 81 | 89 | 99 |
| 79 | 86 | 86 | 90 |
| 69 | 78 | 79 | 88 |

Enhance layer block

−

½ ( *A* + *B* )

| | | | |
|---|---|---|---|
| 73 | 75 | 80 | 79 |
| 70 | 72 | 84 | 98 |
| 78 | 85 | 88 | 92 |
| 63 | 70 | 76 | 83 |

(AVE output)
Base layer block

=

½ (*B* − *A* )

| | | | |
|---|---|---|---|
| 4 | 4 | -1 | -4 |
| 4 | 9 | 5 | 1 |
| 1 | 1 | -2 | -2 |
| 6 | 8 | 3 | 5 |

Residual data 2

FIG. 17

(1) APPLICATION EXAMPLE OF INTER-LAYER COMPENSATION (DECODER SIDE)

½ (B − A)

| | | | |
|---|---|---|---|
| 4 | 4 | -1 | -4 |
| 4 | 9 | 5 | 1 |
| 1 | 1 | -2 | -2 |
| 6 | 8 | 3 | 5 |

Residual data 2

+

½ ( A + B )

| | | | |
|---|---|---|---|
| 73 | 75 | 80 | 79 |
| 70 | 72 | 84 | 98 |
| 78 | 85 | 88 | 92 |
| 63 | 70 | 76 | 83 |

Base layer block

=

B

| | | | |
|---|---|---|---|
| 77 | 79 | 79 | 75 |
| 74 | 81 | 89 | 99 |
| 79 | 86 | 86 | 90 |
| 69 | 78 | 79 | 88 |

Reconstructed
Enhance layer block (2) EXAMPLE OF DECODER POST PROCESSING (INVERSE MIXING PROCESSING)

2 *

½ ( A + B )

| | | | |
|---|---|---|---|
| 73 | 75 | 80 | 79 |
| 70 | 72 | 84 | 98 |
| 78 | 85 | 88 | 92 |
| 63 | 70 | 76 | 83 |

Base layer block

−

B

| | | | |
|---|---|---|---|
| 77 | 79 | 79 | 75 |
| 74 | 81 | 89 | 99 |
| 79 | 86 | 86 | 90 |
| 69 | 78 | 79 | 88 |

Reconstructed
Enhance layer block
(N+1)th frame

=

A

| | | | |
|---|---|---|---|
| 68 | 71 | 80 | 83 |
| 66 | 63 | 79 | 97 |
| 77 | 84 | 90 | 94 |
| 57 | 62 | 73 | 78 |

Nth frame block

FIG. 18

(1) A CASE WHERE MIXING PROCESSING IS NOT PERFORMED

B

| | | | |
|---|---|---|---|
| 220 | 218 | 220 | 216 |
| 214 | 218 | 220 | 219 |
| 202 | 210 | 206 | 200 |
| 223 | 206 | 207 | 218 |

Original (N+1) th frame block

−

A

| | | | |
|---|---|---|---|
| 28 | 26 | 20 | 24 |
| 26 | 22 | 21 | 20 |
| 18 | 20 | 20 | 22 |
| 20 | 22 | 26 | 28 |

Original Nth frame block

=

B - A

| | | | |
|---|---|---|---|
| 192 | 192 | 200 | 192 |
| 188 | 196 | 199 | 199 |
| 184 | 190 | 186 | 178 |
| 203 | 204 | 181 | 190 |

Residual data 1

(2) A CASE WHERE MIXING PROCESSING IS PERFORMED, AND PREDICTION COEFFICIENT IS NOT MULTIPLIED (OR A CASE WHERE PREDICTION COEFFICIENT "1" IS MULTIPLIED)

B

| | | | |
|---|---|---|---|
| 220 | 218 | 220 | 216 |
| 214 | 218 | 220 | 219 |
| 202 | 210 | 206 | 200 |
| 223 | 206 | 207 | 218 |

Enhance layer block

−

½ ( A + B )

| | | | |
|---|---|---|---|
| 124 | 122 | 120 | 120 |
| 120 | 120 | 121 | 120 |
| 110 | 115 | 113 | 111 |
| 122 | 114 | 117 | 123 |

(AVE output)
Base layer block

=

½ (B − A )

| | | | |
|---|---|---|---|
| 96 | 96 | 100 | 96 |
| 94 | 98 | 99 | 99 |
| 92 | 95 | 93 | 89 |
| 101 | 92 | 90 | 95 |

Residual data 2

FIG. 19

(2) A CASE WHERE MIXING PROCESSING IS PERFORMED, AND PREDICTION COEFFICIENT IS NOT MULTIPLIED (OR A CASE WHERE PREDICTION COEFFICIENT "1" IS MULTIPLIED)

B

| | | | |
|---|---|---|---|
| 220 | 218 | 220 | 216 |
| 214 | 218 | 220 | 219 |
| 202 | 210 | 206 | 200 |
| 223 | 206 | 207 | 218 |

Enhance layer block

− 1 *

½ ( A + B )

| | | | |
|---|---|---|---|
| 124 | 122 | 120 | 120 |
| 120 | 120 | 121 | 120 |
| 110 | 115 | 113 | 111 |
| 122 | 114 | 117 | 123 |

(AVE output)
Base layer block

=

½ (B − A )

| | | | |
|---|---|---|---|
| 96 | 96 | 100 | 96 |
| 94 | 98 | 99 | 99 |
| 92 | 95 | 93 | 89 |
| 101 | 92 | 90 | 95 |

Residual data 2

(3) A CASE WHERE MIXING PROCESSING IS PERFORMED, AND PREDICTION COEFFICIENT IS MULTIPLIED

B

| | | | |
|---|---|---|---|
| 220 | 218 | 220 | 216 |
| 214 | 218 | 220 | 219 |
| 202 | 210 | 206 | 200 |
| 223 | 206 | 207 | 218 |

Enhance layer block

− 2 *

½ ( A + B )

| | | | |
|---|---|---|---|
| 124 | 122 | 120 | 120 |
| 120 | 120 | 121 | 120 |
| 110 | 115 | 113 | 111 |
| 122 | 114 | 117 | 123 |

(AVE output)
Base layer block

=

( − A )

| | | | |
|---|---|---|---|
| - 28 | - 26 | - 20 | - 24 |
| - 26 | - 22 | - 22 | - 21 |
| - 18 | - 20 | - 20 | - 22 |
| - 21 | - 22 | - 27 | - 28 |

Residual data 2

FIG. 20

(1) APPLICATION EXAMPLE OF INTER-LAYER COMPENSATION (DECODER SIDE)

( − A )

| | | | |
|---|---|---|---|
| - 28 | - 26 | - 20 | - 24 |
| - 26 | - 22 | - 22 | - 21 |
| - 18 | - 20 | - 20 | - 22 |
| - 21 | - 22 | - 27 | - 28 |

Residual data 2

\+ 2 *

½ ( A + B )

| | | | |
|---|---|---|---|
| 124 | 122 | 120 | 120 |
| 120 | 120 | 121 | 120 |
| 110 | 115 | 113 | 111 |
| 122 | 114 | 117 | 123 |

Base layer block

=

B

| | | | |
|---|---|---|---|
| 220 | 218 | 220 | 216 |
| 214 | 218 | 220 | 219 |
| 202 | 210 | 206 | 200 |
| 223 | 206 | 207 | 218 |

Reconstructed
Enhance layer block (2) EXAMPLE OF DECODER POST PROCESSING (INVERSE MIXING PROCESSING)

2 *

½ ( A + B )

| | | | |
|---|---|---|---|
| 124 | 122 | 120 | 120 |
| 120 | 120 | 121 | 120 |
| 110 | 115 | 113 | 111 |
| 122 | 114 | 117 | 123 |

Base layer block

−

B

| | | | |
|---|---|---|---|
| 220 | 218 | 220 | 216 |
| 214 | 218 | 220 | 219 |
| 202 | 210 | 206 | 200 |
| 223 | 206 | 207 | 218 |

Reconstructed
Enhance layer block
(N+1)th frame

=

A

| | | | |
|---|---|---|---|
| 28 | 26 | 20 | 24 |
| 26 | 22 | 21 | 20 |
| 18 | 20 | 20 | 22 |
| 20 | 22 | 26 | 28 |

Nth frame block

TRANSMISSION DEVICE, TRANSMISSION METHOD, RECEPTION DEVICE AND RECEPTION METHOD

CROSS-REFERENCE TO RELATED APPLICATIONS

This application is a continuation of U.S. patent application Ser. No. 15/750,300, filed Feb. 5, 2018, the entire content of which is incorporated herein by reference. Application Ser. No. 15/750,300 is a National Stage Application of International Application No. PCT/JP2016/073543, filed Aug. 10, 2016, which claims priority to Japanese Patent Application No. 2015-161966, filed Aug. 19, 2015. The benefit of priority is claimed to each of the foregoing.

TECHNICAL FIELD

The present technology relates to a transmission device, a transmission method, a reception device, and a reception method, and more specifically relates to a transmission device and the like that transmit high frame rate moving image data.

BACKGROUND ART

In recent years, a camera is known that performs high frame rate shooting with a high speed frame shutter. For example, while a normal frame rate is 60 fps, 50 fps, or the like, a high frame rate is several times or several tens of times, or furthermore several hundred times the normal frame rate.

In a case where a high frame rate service is performed, it can be considered to convert moving image data shot by a camera with the high speed frame shutter into a moving image sequence of a lower frequency than the moving image data, to transmit the moving image sequence. However, an image of the high speed frame shutter has an effect of reducing motion blur and achieving high sharpness image quality, but also has a factor that causes an image quality problem in a conventional frame interpolation technology in a receiving and reproducing side.

In frame interpolation using a high sharpness image shot with the high speed frame shutter, a difference increases between in a case where motion vector search is suitable and in a case where the motion vector search is not suitable. For that reason, the difference between the two cases becomes a remarkable image quality degradation and is displayed. In the frame interpolation, a high load arithmetic operation is required for improving accuracy of the motion vector search, but the high load arithmetic operation influences a receiver cost.

The applicant has previously devised a technology that performs conversion of a material of an image shot with the high speed frame shutter, and performs display with an image quality higher than a certain level with a conventional receiver that performs normal frame rate decoding (see Patent Document 1).

CITATION LIST

Patent Document

Patent Document 1: WO 2015/076277 A

SUMMARY OF THE INVENTION

Problems to be Solved by the Invention

An object of the present technology is to satisfactorily transmit high frame rate image data.

Solutions to Problems

A concept of the present technology is a transmission device including:

an image processing unit that performs mixing processing in units of two temporally consecutive pictures in predetermined frame rate image data to obtain base frame rate image data, and extracts image data of one picture in units of the two temporally consecutive pictures to obtain high frame rate enhanced frame image data;

an image encoding unit that performs prediction encoding processing of the base frame rate image data to the base frame rate image data to obtain a base stream, and performs prediction encoding processing with respect to the base frame rate image data to the high frame rate enhanced frame image data to obtain an enhanced stream; and a transmission unit that transmits a predetermined format container including the base stream and the enhanced stream.

In the present technology, by the image processing unit, the base frame rate image data and the high frame rate enhanced frame image data are obtained from predetermined frame rate image data. Mixing processing is performed in units of two temporally consecutive pictures in the predetermined frame rate image data, whereby the base frame rate image data is obtained. The image data of one picture is extracted in units of the two temporally consecutive pictures, whereby the high frame rate enhanced frame image data is obtained.

By the image encoding unit, prediction encoding processing of the base frame rate image data is performed to the base frame rate image data, and the base stream is obtained, and prediction encoding processing with respect to the base frame rate image data is performed to the high frame rate enhanced frame image data, and the enhanced stream is obtained. Then, by the transmission unit, a predetermined format container is transmitted including the base stream and the enhanced stream.

As described above, in the present technology, mixing processing is performed in units of two temporally consecutive pictures in the predetermined frame rate image data, and the base frame rate image data is obtained, and the base stream is transmitted obtained by performing prediction encoding processing to the base frame rate image data. For that reason, for example, in a reception side, in a case where there is decoding capability capable of processing the base frame rate image data, by processing the base stream to obtain the base frame rate image data, a smooth image can be displayed as a moving image, and it is possible to avoid that an image quality problem is caused due to frame interpolation processing by low load calculation in display processing.

In addition, in the present technology, the image data of one picture is extracted in units of the two temporally consecutive pictures, and the high frame rate enhanced frame image data is obtained, and prediction encoding processing with respect to the base frame rate image data is performed to the high frame rate enhanced frame image data, and the enhanced stream is obtained and transmitted. In this case, the base frame rate image data is obtained by performing mixing processing in units of two temporally consecutive pictures in the predetermined frame rate image data, so that a prediction residue is reduced, prediction efficiency is improved, and an amount of information data of the enhanced stream can be reduced.

Incidentally, in the present technology, for example, the image encoding unit, when performing prediction encoding processing with respect to the base frame rate image data to the high frame rate enhanced frame image data to obtain the enhanced stream, may multiply the base frame rate image data by a prediction coefficient for reducing the prediction residue. In this case, prediction efficiency can be improved, and the amount of information data of the enhanced stream can be further reduced.

In addition, in the present technology, an information definition unit may be further included that defines the prediction coefficient in a layer of the enhanced stream and/or a layer of the container. The prediction coefficient is defined in this way, whereby, in the reception side, decoding processing for the enhanced stream can be appropriately performed using the prediction coefficient defined.

In addition, another concept of the present technology is a reception device including a reception unit that receives a predetermined format container including a base stream and an enhanced stream, in which:

the base stream is obtained by performing prediction encoding processing of base frame rate image data to the base frame rate image data obtained by performing mixing processing in units of two temporally consecutive pictures in predetermined frame rate image data; and the enhanced stream is obtained by performing prediction encoding processing with respect to the base frame rate image data to high frame rate enhanced frame image data obtained by extracting image data of one picture in units of the two temporally consecutive pictures, and the reception device further includes a processing unit that processes only the base stream to obtain the base frame rate image data, or processes both the base stream and the enhanced stream to obtain the predetermined frame rate image data.

In the present technology, by the reception unit, a predetermined format container is received including the base stream and the enhanced stream. The base stream is obtained by performing prediction encoding processing of base frame rate image data to the base frame rate image data obtained by performing mixing processing in units of two temporally consecutive pictures in predetermined frame rate image data. In addition, the enhanced stream is obtained by performing prediction encoding processing with respect to the base frame rate image data to high frame rate enhanced frame image data obtained by extracting image data of one picture in units of the two temporally consecutive pictures.

By the processing unit, only the base stream is processed, and the base frame rate image data is obtained, or both the base stream and the enhanced stream are processed, and the predetermined frame rate image data is obtained.

As described above, in the present technology, in a case where there is decoding capability capable of processing the base frame rate image data, only the base stream is processed, and the base frame rate image data is obtained. The base frame rate image data is obtained by performing mixing processing in units of two temporally consecutive pictures in the predetermined frame rate image data. For that reason, a smooth image can be displayed as a moving image, and it is possible to avoid that an image quality problem is caused due to frame interpolation processing by low load calculation in display processing.

Incidentally, in the present technology, for example, the prediction coefficient for reducing (suppressing) the prediction residue may be defined in the layer of the enhanced stream and/or the layer of the container, and the processing unit, when obtaining the high frame rate enhanced frame image data, may multiply the base frame rate image data obtained by processing the base stream, by the prediction coefficient defined, to make reference image data. With this arrangement, decoding processing for the enhanced stream can be appropriately performed.

In addition, another concept of the present technology is a transmission device including an image processing unit that performs mixing processing in units of two temporally consecutive pictures in predetermined frame rate image data to obtain base frame rate image data, and extracts image data of one picture in units of the two temporally consecutive pictures to obtain high frame rate enhanced frame image data;

an image encoding unit that performs encoding processing to the base frame rate image data to obtain a base stream, and performs encoding processing to the high frame rate enhanced frame image data to obtain an enhanced stream; and a transmission unit that transmits a predetermined format container including the base stream and the enhanced stream.

In the present technology, by the image processing unit, the base frame rate image data and the high frame rate enhanced frame image data are obtained from predetermined frame rate image data. Mixing processing is performed in units of two temporally consecutive pictures in the predetermined frame rate image data, whereby the base frame rate image data is obtained. The image data of one picture is extracted in units of the two temporally consecutive pictures, whereby the high frame rate enhanced frame image data is obtained.

By the image encoding unit, encoding processing is performed to the base frame rate image data, and the base stream is obtained, and encoding processing is performed to the high frame rate enhanced frame image data, and the enhanced stream is obtained. Then, by the transmission unit, a predetermined format container is transmitted including the base stream and the enhanced stream.

As described above, in the present technology, mixing processing is performed in units of two temporally consecutive pictures in the predetermined frame rate image data, and the base frame rate image data is obtained, and encoding processing is performed to the base frame rate image data, and the base stream is obtained and transmitted. For that reason, for example, in a reception side, in a case where there is decoding capability capable of processing the base frame rate image data, by processing the base stream to obtain the base frame rate image data, a smooth image can be displayed as a moving image, and it is possible to avoid that an image quality problem is caused due to frame interpolation processing by low load calculation in display processing.

In addition, another concept of the present technology is a reception device including:

a reception unit that receives a predetermined format container including a base stream and an enhanced stream, in which:

the base stream is obtained by performing encoding processing to base frame rate image data obtained by performing mixing processing in units of two temporally consecutive pictures in predetermined frame rate image data; and the enhanced stream is obtained by performing encoding processing to high frame rate enhanced frame image data obtained by extracting image data of one picture in units of the two temporally consecutive pictures, and the reception device further includes a processing unit that processes only the base stream to obtain the base frame rate image data, or processes both the base stream and the enhanced stream to obtain the predetermined frame rate image data.

In the present technology, by the reception unit, a predetermined format container is received including the base stream and the enhanced stream. The base stream is obtained by performing encoding processing to the base frame rate image data obtained by performing mixing processing in units of two temporally consecutive pictures in the predetermined frame rate image data. In addition, the enhanced stream is obtained by performing encoding processing to the high frame rate enhanced frame image data obtained by extracting the image data of one picture in units of the two temporally consecutive pictures.

By the processing unit, only the base stream is processed, and the base frame rate image data is obtained, or both the base stream and the enhanced stream are processed, and the predetermined frame rate image data is obtained.

As described above, in the present technology, in a case where there is decoding capability capable of processing the base frame rate image data, only the base stream is processed, and the base frame rate image data is obtained. The base frame rate image data is obtained by performing mixing processing in units of two temporally consecutive pictures in the predetermined frame rate image data. For that reason, a smooth image can be displayed as a moving image, and it is possible to avoid that an image quality problem is caused due to frame interpolation processing by low load calculation in display processing.

Effects of the Invention

According to the present technology, high frame rate image data can be satisfactorily transmitted. Incidentally, the effect described here is not necessarily limited, and can be any effect described in the present disclosure.

BRIEF DESCRIPTION OF DRAWINGS

FIG. 8 is a diagram showing an example structure of a layer prediction mapping SEI, and details of main information in the example structure.

FIG. 9 is a diagram showing an example structure of a layer prediction mapping descriptor, and details of main information in the example structure.

FIG. 16 is a diagram comparatively showing examples of (1) a prediction residue in a case where mixing processing is not performed, and (2) a prediction residue in a case where mixing processing is performed.

FIG. 17 is a diagram showing (1) an application example of inter-layer compensation of a decoder side, and (2) an example of decoder post processing (inverse mixing processing), in the case where mixing processing is performed.

FIG. 18 is a diagram comparatively showing (1) a prediction residue in a case where mixing processing is not performed, and (2) a prediction residue in a case where mixing processing is performed, and a prediction coefficient is not multiplied (same as a case where a prediction coefficient "1" is multiplied).

FIG. 19 is a diagram comparatively showing (1) the prediction residue in the case where mixing processing is performed, and the prediction coefficient is not multiplied (same as the case where the prediction coefficient "1" is multiplied), and (2) a prediction residue in a case where mixing processing is performed, and the prediction coefficient is multiplied.

FIG. 20 is a diagram showing (1) an application example of inter-layer compensation of the decoder side, and (2) an example of decoder post processing (inverse mixing processing), in the case where mixing processing is performed, and the prediction coefficient is multiplied.

MODES FOR CARRYING OUT THE INVENTION

The following is a description of a mode for carrying out the invention (the mode will be hereinafter referred to as the "embodiment"). Note that, explanation will be made in the following order.

1. Embodiment
2. Modifications

1. Embodiment

[Transmission/Reception System]

Figure 1:
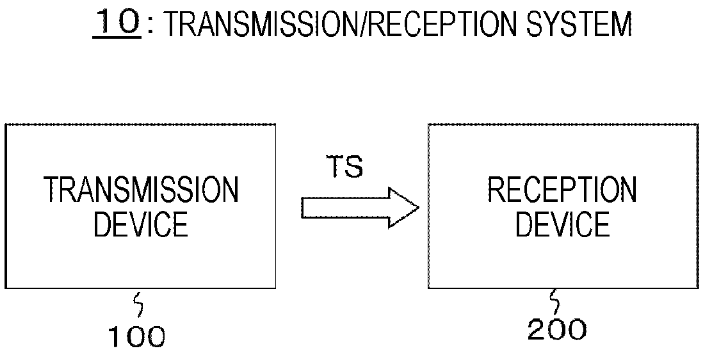
FIG. 1 is a block diagram showing an example configuration of a transmission/reception system as an embodiment.

FIG. 1 shows an example configuration of a transmission/reception system 10 as an embodiment. The transmission/reception system 10 includes a transmission device 100, and a reception device 200.

The transmission device 100 transmits a transport stream TS as a container on a broadcast wave. The transport stream TS includes a base stream (base video stream) and an enhanced stream (enhanced video stream) obtained by processing high frame rate image data that is 120 fps image data (moving image data) in the embodiment.

Here, the base stream is obtained by performing prediction encoding processing of a base frame rate image data to the base frame rate image data obtained by performing mixing processing in units of two temporally consecutive pictures in 120 fps image data. The base frame rate image data is 60 fps image data.

In addition, the enhanced stream is obtained by adaptively performing prediction encoding processing with respect to the base frame rate image data, or prediction encoding processing of high frame rate enhanced frame image data, to the high frame rate enhanced frame image data obtained by extracting image data of one picture in units of the two temporally consecutive pictures. The high frame rate enhanced frame image data is 60 fps image data.

Figure 2:
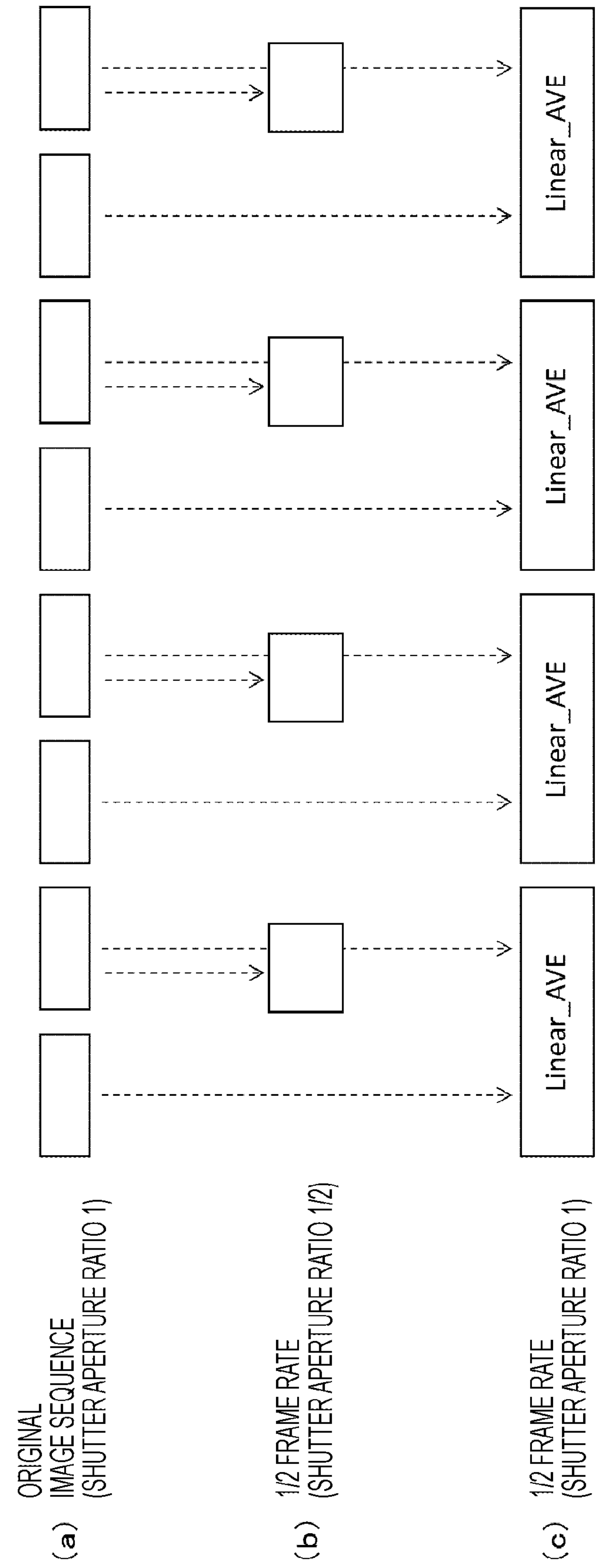
FIG. 2 is a diagram showing an example of frame rate conversion processing.

Here, it is assumed that 120 fps image data is an original image sequence, as illustrated in FIG. 2(*a*). In this case, the base frame rate image data obtained by performing mixing processing in units of two temporally consecutive pictures has a shutter aperture ratio of 1 (100%) to the time covered by the original image sequence, as illustrated in FIG. 2(*c*). In addition, in this case, the high frame rate enhanced frame image data obtained by extracting image data of one picture in units of the consecutive two pictures has a shutter aperture ratio of 1/2 (50%) to the time covered by the original image sequence, as illustrated in FIG. 2(*b*).

In the embodiment, when prediction encoding processing with respect to the base frame rate image data is performed to the high frame rate enhanced frame image data, and the enhanced stream is obtained, the base frame rate image data is multiplied by a prediction coefficient for reducing a prediction residue. With this arrangement, prediction efficiency can be improved, and an amount of information data of the enhanced stream can be reduced.

The prediction coefficient for reducing the above-described prediction residue is defined in a layer of the enhanced stream and/or a layer of the transport stream TS as the container. In the embodiment, the transmission device 100 inserts an SEI message in which the prediction coefficient is defined, into the layer of the video stream. In addition, the transmission device 100 inserts a descriptor in which the prediction coefficient is defined, into the layer of the transport stream TS. In a reception side, the prediction coefficient defined in this way is used, whereby decoding processing for the enhanced stream can be appropriately performed.

The reception device 200 receives the above-described transport stream TS transmitted on the broadcast wave from the transmission device 100. The reception device 200, in a case where there is decoding capability capable of processing 60 fps image data, processes only the base stream included in the transport stream TS to obtain the base frame rate image data, and reproduces an image.

On the other hand, the reception device 200, in a case where there is decoding capability capable of processing 120 fps image data, processes both the base stream and the enhanced stream included in the transport stream TS to obtain 120 fps image data, and reproduces an image.

Here, the reception device 200, when obtaining enhanced frame image data, multiplies 60 fps image data obtained by processing the base stream by the prediction coefficient for reducing the prediction residue defined in the layer of the enhanced stream and the layer of the transport stream TS, as described above, to make reference image data. With this arrangement, decoding processing for the enhanced stream can be appropriately performed.

"Configuration of Transmission Device"

Figure 3:
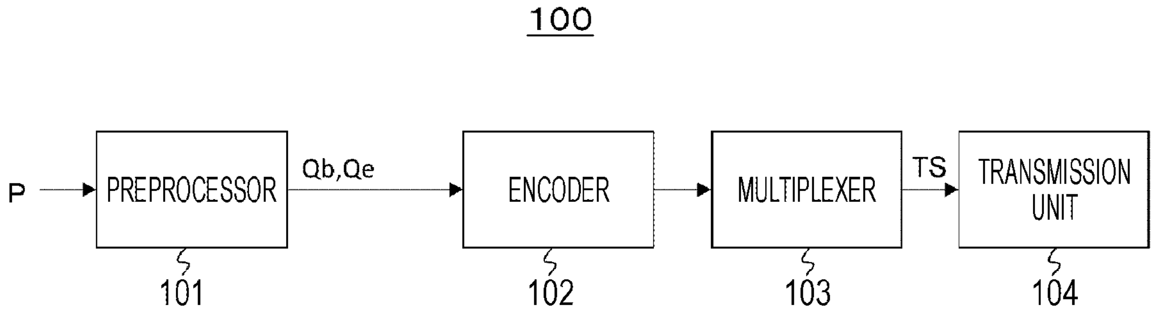
FIG. 3 is a block diagram showing an example configuration of a transmission device.

FIG. 3 shows an example configuration of the transmission device 100. The transmission device 100 includes a preprocessor 101, an encoder 102, a multiplexer 103, and a transmission unit 104. The preprocessor 101 inputs 120 fps image data P to output base frame rate image data Qb and high frame rate enhanced frame image data Qe.

Here, the preprocessor 101 performs mixing processing in units of two temporally consecutive pictures in the 120 fps image data P to obtain the base frame rate image data Qb. In addition, the preprocessor 101 extracts image data of one picture in units of the two temporally consecutive pictures in the 120 fps image data P to obtain the high frame rate enhanced frame image data Qe.

Figure 4:
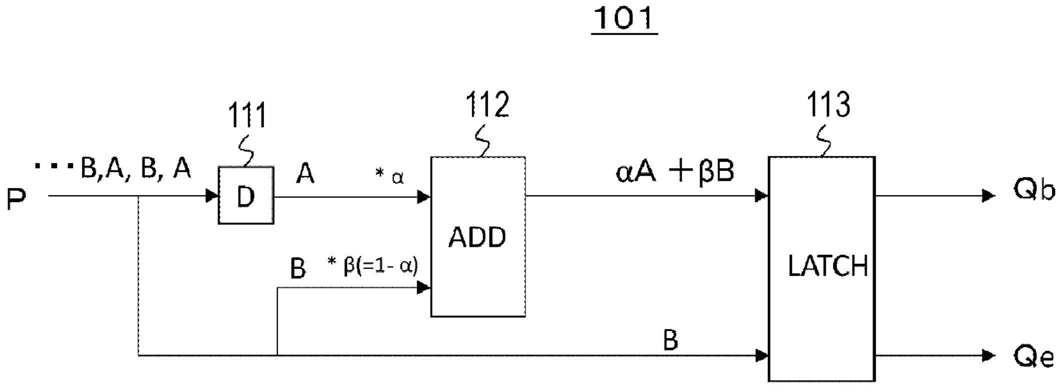
FIG. 4 is a block diagram showing an example configuration of a preprocessor configuring the transmission device.

FIG. 4 shows an example configuration of the preprocessor 101. The preprocessor 101 includes a delay circuit 111 that causes a delay of one frame of 120 fps, an arithmetic circuit 112, and a latch circuit 113 that performs latching with a 60 Hz latch pulse synchronized with the delay circuit 111.

The 120 fps image data P is delayed by one frame period by the delay circuit 111, and then input to the arithmetic circuit 112 with a gain α. Incidentally, α=0 to 1. Meanwhile, image data subsequent to the image data P to be delayed by the delay circuit 111 is input to the arithmetic circuit 112 with a gain β without passing through the delay circuit 111. Incidentally, β=1−α. In the arithmetic circuit 112, output of the delay circuit 111 and the 120 fps image data P are added together. Here, when two temporally consecutive pictures of the image data P are A and B, at timing when the output of the delay circuit 111 is A, mixed output "α*A+β*B" is obtained as output of the arithmetic circuit 112. The output of the arithmetic circuit 112 is input to the latch circuit 113.

In the latch circuit 113, the output of the arithmetic circuit 112 is latched with the 60 Hz latch pulse, and the base frame rate image data Qb to which mixing processing is performed is obtained, in units of two temporally consecutive pictures in the image data P. In addition, in the latch circuit 113, the 120 fps image data P is latched with the 60 Hz latch pulse, and the enhanced frame image data Qe configuring the high frame rate is obtained in units of the two temporally consecutive pictures.

Figure 5:
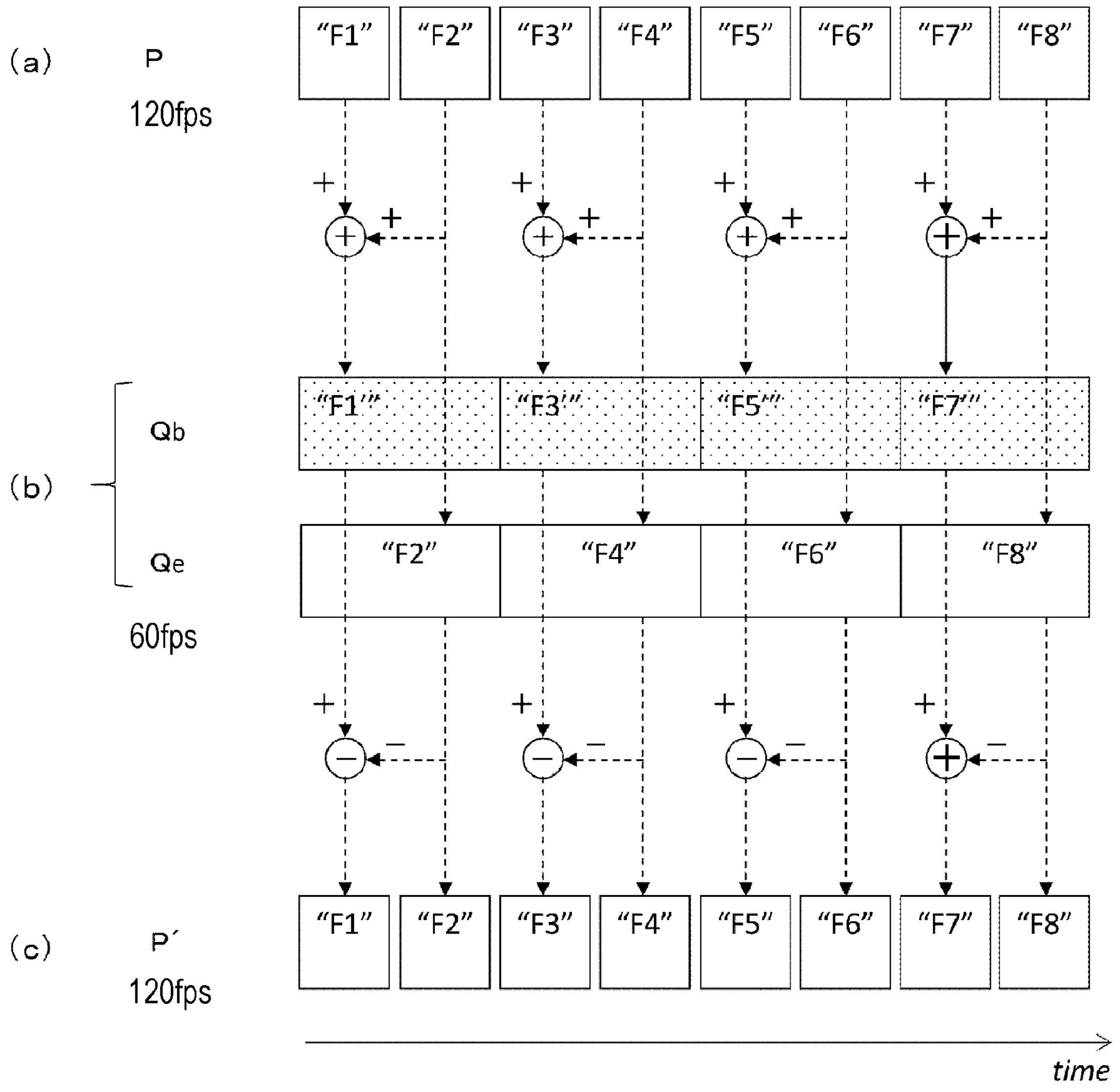
FIG. 5 is a diagram showing an example of a relationship between input/output data of the preprocessor configuring the transmission device and a postprocessor configuring a reception device.

FIGS. 5(*a*) and 5(*b*) schematically show an example of a relationship between input data (image data P) of the preprocessor 101 and output data (image data Qb and Qe) of the preprocessor 101. Corresponding to image data of each picture of the image data P, F1, F2, F3, F4, F5, F6, F7, F8, . . . , image data of each picture of the image data Qb, F1', F3', F5', F7', . . . , and image data of each picture of the image data Qe, F2, F4, F6, F8, . . . , are obtained.

Referring back to FIG. 3, the encoder 102 performs encoding processing to the image data Qb and Qe obtained by the preprocessor 101, to generate the base stream and the enhanced stream. Here, the encoder 102 performs prediction encoding processing of the base frame rate image data to the base frame rate image data Qb, to obtain the base stream. In addition, the encoder 102 adaptively performs prediction encoding processing with respect to the base frame rate image data Qb or prediction encoding processing of the high frame rate enhanced frame image data, to the high frame rate enhanced frame image data Qe, to obtain the enhanced frame.

The encoder 102, when performing prediction encoding processing with respect to the base frame rate image data Qb to the high frame rate enhanced frame image data Qe, to obtain the enhanced stream, multiplies the base frame rate image data Qb by the prediction coefficient for reducing the prediction residue.

Figure 6:
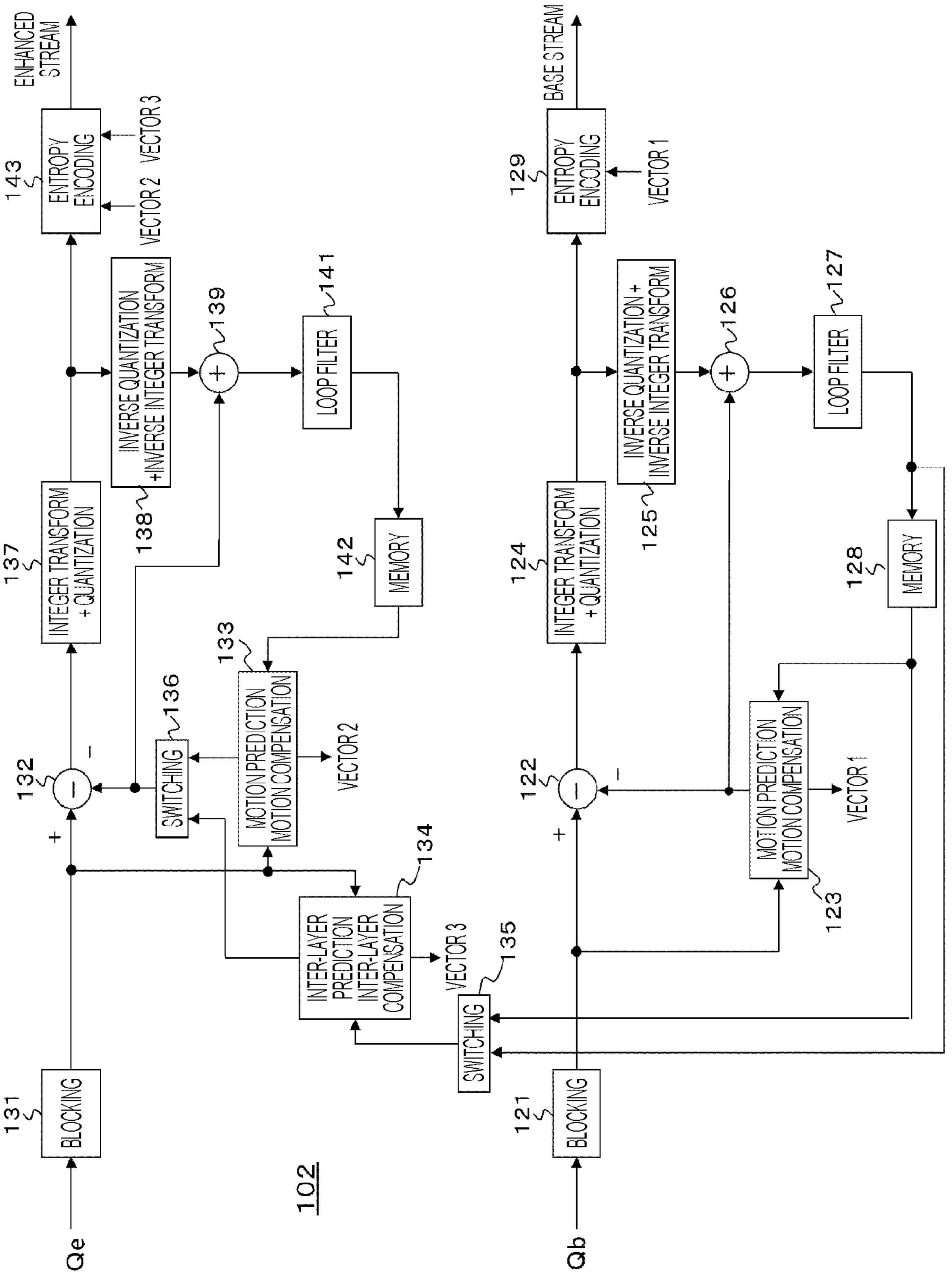
FIG. 6 is a block diagram showing an example configuration of an encoding processing unit of an encoder.

FIG. 6 shows an example configuration of an encoding processing unit of the encoder 102. The encoder 102 includes a block circuit 121, a subtraction circuit 122, a motion prediction/motion compensation circuit 123, an integer transform/quantization circuit 124, an inverse quantization/inverse integer transform circuit 125, an addition circuit 126, a loop filter 127, a memory 128, and an entropy encoding circuit 129.

In addition, the encoder 102 includes a blocking circuit 131, a subtraction circuit 132, a motion prediction/motion compensation circuit 133, an inter-layer prediction/inter-layer compensation circuit 134, switching circuits 135 and 136, an integer transform/quantization circuit 137, an inverse quantization/inverse integer transform circuit 138, an addition circuit 139, a loop filter 141, a memory 142, and an entropy encoding circuit 143.

The base frame rate image data Qb is input to the blocking circuit 121. In the blocking circuit 121, image data of each picture configuring the image data Qb is divided into blocks (macroblocks (MBs)) in units of encoding processing. The blocks are sequentially supplied to the subtraction circuit 122. In the motion prediction/motion compensation circuit 123, on the basis of image data of a reference picture stored in the memory 128, a motion compensated prediction reference block is obtained for each block.

Each prediction reference block obtained by the motion prediction/motion compensation circuit 123 is sequentially supplied to the subtraction circuit 122. In the subtraction circuit 122, subtraction processing is performed to the prediction reference block for each block obtained by the blocking circuit 121, and a prediction error is obtained. The prediction error of each block is subjected to integer transform (for example, DCT transform) by the integer transform/quantization circuit 124, and then quantized.

Quantization data of each block obtained by the integer transform/quantization circuit 124 is supplied to the inverse quantization/inverse integer transform circuit 125. In the inverse quantization/inverse integer transform circuit 125, inverse quantization is performed to the quantization data, and inverse integer transform is further performed, and the prediction residue is obtained. The prediction error is supplied to the addition circuit 126.

In the addition circuit 126, the motion compensated prediction reference block is added to the prediction residue, and a block is obtained. After reduction of quantization noise by the loop filter 127, the block is stored in the memory 128.

In addition, the quantization data of each block obtained by the integer transform/quantization circuit 124 is supplied to the entropy encoding circuit 129, to be subjected to entropy encoding, and the base stream is obtained that is a prediction encoding result of the base frame rate image data Qb. Incidentally, to the base stream, information such as a motion vector in each block is added as MB header information for decoding in the reception side.

In addition, the high frame rate enhanced frame image data Qe is input to the blocking circuit 131. In the blocking circuit 131, image data of each picture configuring the image data Qe is divided into blocks (macroblocks (MB)) in units of encoding processing. The blocks are sequentially supplied to the subtraction circuit 132.

In the motion prediction/motion compensation circuit 133, on the basis of image data of a reference picture stored in the memory 142, a motion compensated prediction reference block for intra-layer prediction is obtained. In the inter-layer prediction/inter-layer compensation circuit 134, a prediction reference block for inter-layer prediction is obtained that is motion compensated on the basis of output of the loop filter 127 or image data of a reference picture stored in the memory 128, and further multiplied by the prediction coefficient for reducing the prediction residue.

In the switching circuit 135, when a target of the base stream referenced in inter-layer prediction is an image of the base stream processed at the same time as a picture of an enhanced layer, output of the loop filter 127 is selected. On the other hand, in the switching circuit 135, when the target of the base stream referenced in inter-layer prediction is an image of the base stream of past or future in display order, output of the memory 128 is selected. Incidentally, processing of a picture of a base layer and processing of a picture of the enhanced layer are performed at the same timing.

Figure 7:
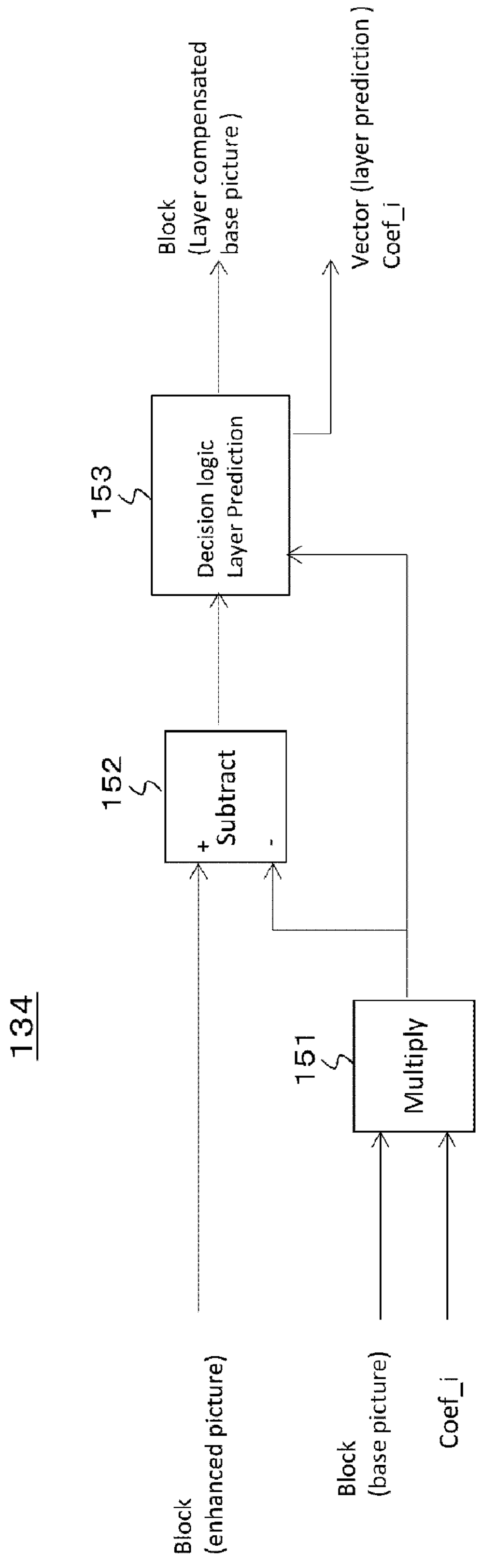
FIG. 7 is a block diagram showing a detailed example configuration of an inter-layer prediction/inter-layer compensation circuit.

FIG. 7 shows a further detailed example configuration of the inter-layer prediction/inter-layer compensation circuit 134. The inter-layer prediction/inter-layer compensation circuit 134 includes a multiplication unit 151, a subtraction unit 152, and a decision logic unit 153. In the multiplication unit 151, a block of the base layer is multiplied by a prediction coefficient "Coef_i". Output of the multiplication unit 151 is supplied to the subtraction unit 152 and the decision logic unit 153.

In the subtraction unit 152, the block of the base layer multiplied by the prediction coefficient "Coef_i" is subtracted from a block of the enhanced layer, and residual data is obtained. The residual data is supplied to the decision logic 153. In the decision logic 153, a motion vector "Vector" and the prediction coefficient "Coef_i" are adjusted such that residual power is minimum, and the prediction reference block for inter-layer prediction is decided. Incidentally, for each time when the motion vector "Vector" is adjusted, the block of the base layer supplied to the multiplication unit 151 is motion-compensated with the motion vector "Vector".

Referring back to FIG. 6, the prediction reference block for intra-layer prediction obtained by the motion prediction/motion compensation circuit 133, or the prediction reference block for inter-layer prediction obtained by the inter-layer prediction/inter-layer compensation circuit 134 is selected in units of the block or the picture by the switching circuit 136, and supplied to the subtraction circuit 132. For example, in the switching circuit 136, switching is performed such that a residual component is reduced. In addition, for example, in the switching circuit 136, switching to one of the blocks is forcibly performed depending on whether or not the sequence is in a boundary.

In the subtraction circuit 132, for each block obtained by the blocking circuit 131, subtraction processing is performed to the prediction reference block, and the prediction error is obtained. The prediction error of each block is subjected to integer transform (for example, DCT transform) by the integer transform/quantization circuit 137, and then quantized.

Quantization data of each block obtained by the integer transform/quantization circuit 137 is supplied to the inverse quantization/inverse integer transform circuit 138. In the inverse quantization/inverse integer transform circuit 138, inverse quantization is performed to the quantization data, and inverse integer transform is further performed, and the prediction residue is obtained. The prediction error of each block is supplied to the addition circuit 139.

To the addition circuit 139, the prediction reference block selected by the switching circuit 136 is supplied. In the addition circuit 139, the motion compensated prediction reference block is added to the prediction residue, and a block is obtained. After reduction of quantization noise by the loop filter 141, the block is stored in the memory 142.

In addition, the quantization data of each block obtained by the integer transform/quantization circuit 137 is supplied to the entropy encoding circuit 143, to be subjected to entropy encoding, and the enhanced stream is obtained that is a prediction encoding result of the high frame rate enhanced frame image data Qe.

Incidentally, in the enhanced stream, information such as the motion vector in each block, the prediction coefficient, and switching of the prediction reference block is added as MB block information for decoding in the reception side.

Here, in a case where the prediction reference block of inter-layer prediction is used for a predetermined block of the enhanced layer and prediction encoding is performed, the prediction coefficient "Coef_i" is added corresponding to encoded data of the predetermined block. For example, in a case where encoding of HEVC or SHVC, in relation to prediction processing included in "slice_segment_header( )" of a slice, the prediction coefficient "Coef_i" is identified by an "id" specified by "luma_weight table" and "chroma_ weight table" in "pred_weight_table( )". A relationship between the "id" and the prediction coefficient "Coef_i" identified by the "id" is defined in the layer of the enhanced stream and/or the layer of the transport stream TS as the container.

Referring back to FIG. 3, the encoder 102 defines the prediction coefficient in the layer of the enhanced stream. That is, the SEI message in which the relationship between the "id" and the prediction coefficient "Coef_i" identified by the "id" is defined, is inserted into the layer of the enhanced stream. In this case, the encoder 102 inserts a layer prediction mapping SEI (layer prediction mapping SEI) that is newly defined, into a part of "SEIs" of an access unit (AU).

FIG. 8(*a*) shows an example structure (Syntax) of the layer prediction mapping SEI. FIG. 8(*b*) shows details (Semantics) of main information in the example structure. An 8-bit field of "number_of_coef" indicates the number of coefficients to multiply a prediction target in layer prediction, that is, the number of prediction coefficients "Coef_i". For example, in a case of N, a for loop is repeated until i=0 to N−1. At this time, the "i" corresponds to the "id".

An 8-bit field of "prediction_coef[i]" indicates a coefficient to multiply the prediction target in layer prediction, that is, a value of the prediction coefficient "Coef_i". For example, "0x00" indicates "1.00", "0x01" indicates 0.25, "0x02" indicates 0.50, "0x03" indicates 0.75, "0x04" indicates 2.00, "0x05" indicates 1.25, "0x06" indicates 1.50, and "0x07" indicates 1.75.

Referring back to FIG. 3, the multiplexer 103 packetizes the base stream and the enhanced stream generated by the encoder 102 into a PES (Packetized Elementary Stream) packet, and further into a transport packet to multiplex the streams, and obtains the transport stream TS as a multiplexed stream.

In addition, the multiplexer 103 defines the prediction coefficient in the layer of the transport stream TS. That is, the descriptor in which the relationship between the "id" and the prediction coefficient "Coef_i" identified by the "id" is defined, is inserted into the layer of the transport stream TS. In this case, the multiplexer 103 inserts a layer prediction mapping descriptor (layer_prediction_mapping_descriptor) that is newly defined, into a video elementary stream loop arranged corresponding to the enhanced stream under a program map table.

FIG. 9(*a*) shows an example structure (Syntax) of the layer prediction mapping descriptor. FIG. 9(*b*) shows details (Semantics) of main information in the example structure. An 8-bit field of "Layer_prediction_mapping_descriptor_tag" indicates a descriptor type, and indicates that it is the layer prediction mapping descriptor, here. An 8-bit field of "Layer_prediction_mapping_descriptor_length" indicates the length (size) of the descriptor, and indicates the number of subsequent bytes as the length of the descriptor.

An 8-bit field of "number_of_coef" indicates the number of coefficients to multiply a prediction target in layer prediction, that is, the number of prediction coefficients "Coef_i". For example, in a case of N, a for loop is repeated until i=0 to N−1. At this time, the "i" corresponds to the "id". An 8-bit field of "prediction_coef[i]" indicates a coefficient to multiply the prediction target in layer prediction, that is, a value of the prediction coefficient "Coef_i".

Figure 10:
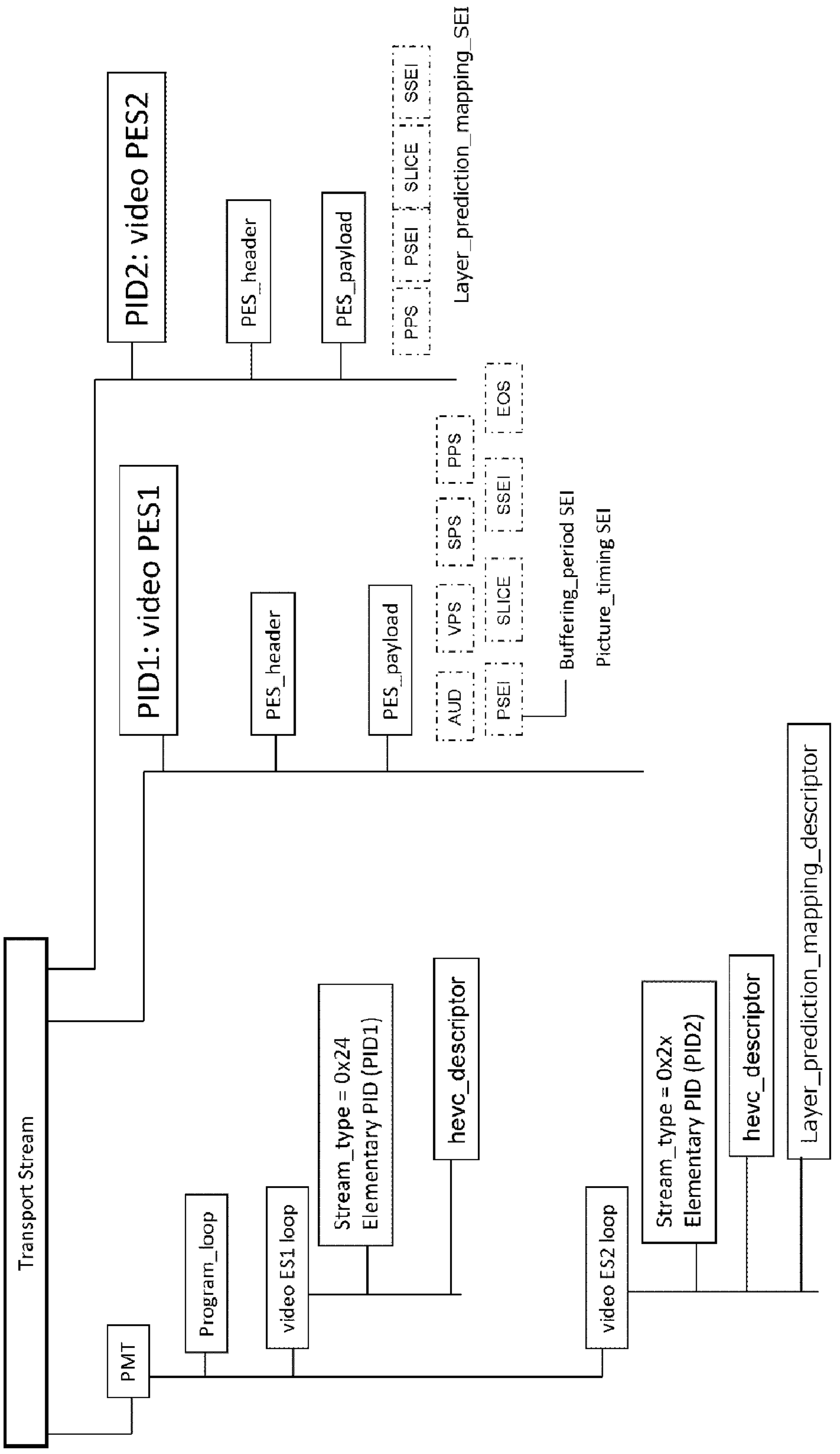
FIG. 10 is a diagram showing an example configuration of a transport stream TS.

FIG. 10 shows an example configuration of the transport stream TS. The transport stream TS includes two video streams, the base stream and the enhanced stream. That is, in the example configuration, a PES packet of the base stream, "video PES1", exists, and a PES packet of the enhanced stream, "video PES2" exists. Into encoded image data of each picture contained by the PES packet "video PES2", the layer prediction mapping SEI (see FIG. 8(*a*)) is inserted.

In addition, the transport stream TS includes a Program Map Table (PMT) as one of pieces of Program Specific Information (PSI). The PSI is information describing which program each elementary stream included in the transport stream belongs to.

In the PMT, a program loop (Program loop) exists describing information related to the entire program. In addition, in the PMT, an elementary stream loop exists having information related to each video stream. In the example configuration, a video elementary stream loop corresponding to the base stream, "video ES1 loop", exists, and a video elementary stream loop corresponding to the enhanced stream, "video ES2 loop" exists.

In the "video ES1 loop", information is arranged, such as a stream type and a packet identifier (PID), corresponding to the base stream (video PES1), and a descriptor is also arranged describing information related to the video stream. The stream type is "0x24" that indicates the base stream.

In addition, in the "video ES2 loop", information is arranged, such as a stream type and a packet identifier (PID), corresponding to the enhanced stream (video PES2), and a descriptor is also arranged describing information related to the video stream. The stream type is "0x2x" that indicates the enhanced stream. In addition, as one of descriptors, the layer prediction mapping descriptor (see FIG. 9(*a*)) is inserted.

Referring back to FIG. 3, the transmission unit 104 modulates the transport stream TS by, for example, a modulation method suitable for broadcasting, such as QPSK/OFDM, and transmits an RF modulation signal from a transmitting antenna.

Operation of the transmission device 100 shown in FIG. 3 will be briefly described. The 120 fps image data P is input to the preprocessor 101. Then, the base frame rate image data Qb and the high frame rate enhanced frame image data Qe are output from the preprocessor 101.

Here, in the preprocessor 101, mixing processing is performed in units of two temporally consecutive pictures in the 120 fps image data P, and the base frame rate image data Qb is obtained. In addition, in the preprocessor 101, image data of one picture is extracted in units of the two temporally consecutive pictures, and the high frame rate enhanced frame image data Qe is obtained.

The image data Qb and Qe obtained by the preprocessor 101 are supplied to the encoder 102. In the encoder 102, encoding processing is performed to the image data Qb and Qe, and the base stream and the enhanced stream are generated. Here, in the encoder 102, prediction encoding processing of the base frame rate image data is performed to the base frame rate image data Qb, and the base stream is obtained.

In addition, in the encoder 102, prediction encoding processing with respect to the base frame rate image data Qb, or prediction encoding processing of the high frame rate enhanced frame image data is adaptively performed to the high frame rate enhanced frame image data Qe, and the enhanced frame is obtained. Here, in the encoder 102, when prediction encoding processing with respect to the image data Qb of the base layer is performed to the image data Qe of the enhanced layer, the image data Qb of the base layer is multiplied by the prediction coefficient for reducing the prediction residue.

In the encoder 102, the prediction coefficient is defined in the layer of the enhanced stream. Specifically, the layer prediction mapping SEI (see FIG. 8(*a*)) in which the relationship between the “id” of the prediction coefficient and the prediction coefficient “Coef_i” identified by the “id” is defined, is inserted into the layer of the enhanced stream.

The base stream and the enhanced stream generated by the encoder 102 are supplied to the multiplexer 103. In the multiplexer 103, the base stream and the enhanced stream are packetized into the PES packet, and further into the transport packet to be multiplexed, and the transport stream TS is obtained as the multiplexed stream.

In addition, in the multiplexer 103, the prediction coefficient is defined in the layer of the transport stream TS. Specifically, the layer prediction mapping descriptor (see FIG. 9(*a*)) in which the relationship between the “id” of the prediction coefficient and the prediction coefficient “Coef_i” identified by the “id” is defined, is inserted into the video elementary stream loop arranged corresponding to the enhanced stream under the program map table.

The transport stream TS generated by the multiplexer 103 is transmitted to the transmission unit 104. In the transmission unit 104, the transport stream TS is modulated by, for example, the modulation method suitable for broadcasting, such as QPSK/OFDM, and the RF modulation signal is transmitted from the transmitting antenna.

“Configuration of Reception Device”

Figure 11:
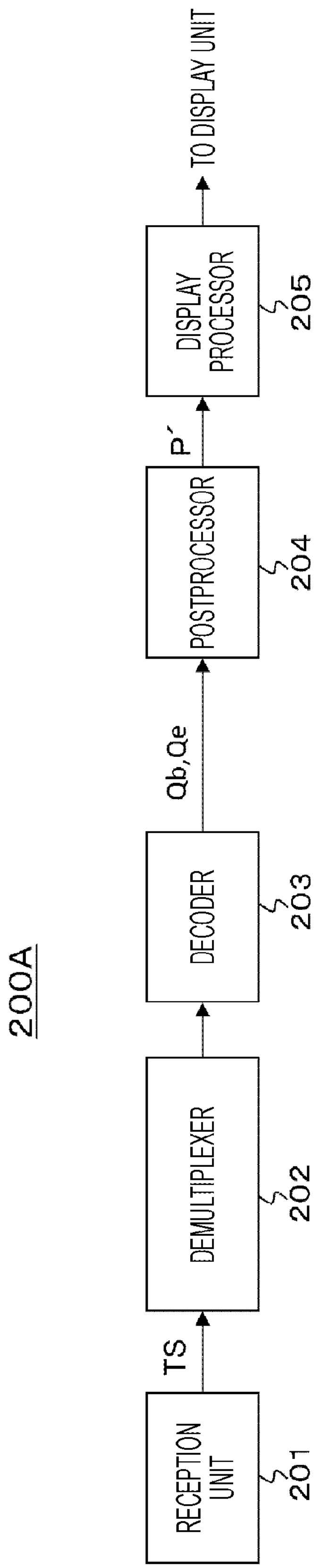
FIG. 11 is a block diagram showing an example configuration of the reception device (adaptable to a high frame rate).

FIG. 11 shows an example configuration of the reception device 200A having decoding capability capable of processing 120 fps moving image data. The reception device 200A includes a reception unit 201, a demultiplexer 202, a decoder 203, a postprocessor 204, and a display processor 205.

The reception unit 201 demodulates the RF modulation signal received by a receiving antenna, to acquire the transport stream TS. The demultiplexer 202 extracts the base stream and the enhanced stream by filtering of the PID, from the transport stream TS, and supplies the streams to the decoder 203.

In addition, the demultiplexer 202 extracts section information included in the layer of the transport stream TS, and transmits the information to a control unit (not shown). In this case, the layer prediction mapping descriptor (see FIG. 9(*a*)) is also extracted. With this arrangement, the control unit recognizes the relationship between the “id” of the prediction coefficient and the prediction coefficient “Coef_i” identified by the “id”.

The decoder 203 performs decoding processing to the base stream to obtain the base frame rate image data Qb, and performs decoding processing to the enhanced stream to obtain the high frame rate enhanced frame image data Qe. Here, the image data Qb is obtained by performing mixing processing in units of two temporally consecutive pictures in the 120 fps image data P, and the image data Qe is obtained by extracting image data of one picture in units of the two temporally consecutive pictures (see FIGS. 5(*a*) and 5(*b*)).

In addition, the decoder 203 extracts a parameter set and SEI inserted into each access unit configuring the base stream and the enhanced stream, and transmits the parameter set and the SEI to the control unit (not shown). In this case, the layer prediction mapping SEI (see FIG. 8(*a*)) is also extracted. With this arrangement, the control unit recognizes the relationship between the “id” of the prediction coefficient and the prediction coefficient “Coef_i” identified by the “id”.

Figure 12:
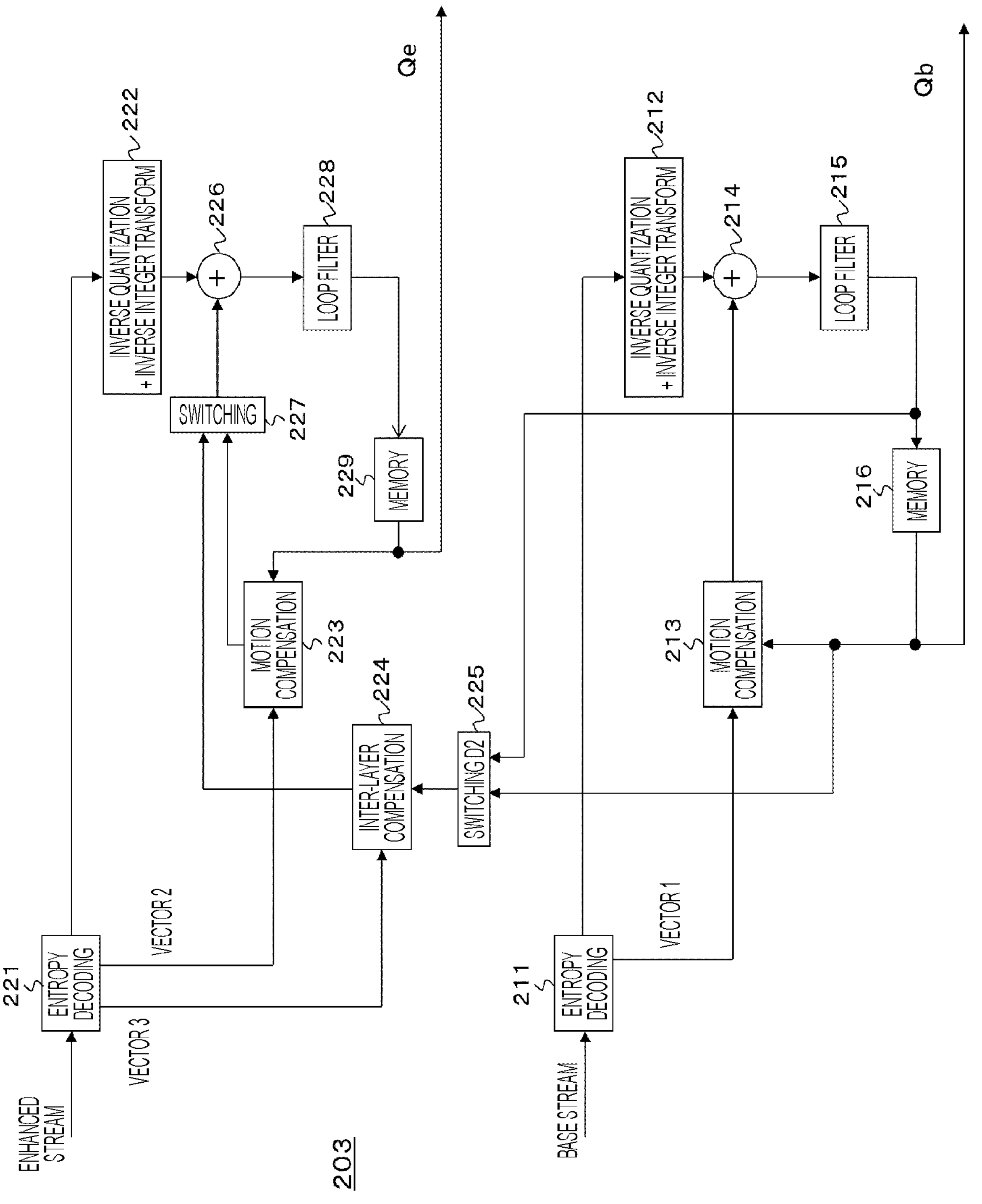
FIG. 12 is a block diagram showing an example configuration of a decoding processing unit of a decoder.

FIG. 12 shows an example configuration of a decoding processing unit of the decoder 203. The decoder 203 includes an entropy decoding circuit 211, an inverse quantization/inverse integer transform circuit 212, a motion compensation circuit 213, an addition circuit 214, a loop filter 215, and a memory 216.

In addition, the decoder 203 includes an entropy decoding circuit 221, an inverse quantization/inverse integer transform circuit 222, a motion compensation circuit 223, an inter-layer compensation circuit 224, a switching circuit 225, an addition circuit 226, a switching circuit 227, a loop filter 228, and a memory 229.

In the entropy decoding circuit 211, entropy decoding is performed to the base stream, and quantization data is obtained for each block of the base layer. The quantization data is supplied to the inverse quantization/inverse integer transform circuit 212. In the inverse quantization/inverse integer transform circuit 212, inverse quantization is performed to the quantization data, and inverse integer transform is further performed, and the prediction residue is obtained. The prediction error of each block is supplied to the addition circuit 214.

In the motion compensation circuit 213, on the basis of image data of a reference picture stored in the memory 216, a motion compensated compensation reference block is obtained. Here, motion compensation is performed by using a motion vector included as MB header information. In the addition circuit 214, the compensation reference block is added to the prediction residue, and a block is obtained configuring the base frame rate image data Qb.

After reduction of quantization noise by the loop filter 125, the block obtained by the addition circuit 214 in this way is stored in the memory 216. Then, by reading of stored data from the memory 216, the base frame rate image data Qb is obtained.

In the entropy decoding circuit 221, entropy decoding is performed to the enhanced stream, and quantization data is obtained for each block of the enhanced layer. The quantization data is supplied to the inverse quantization/inverse integer transform circuit 222. In the inverse quantization/inverse integer transform circuit 222, inverse quantization is performed to the quantization data, and inverse integer transform is further performed, and the prediction residue is obtained. The prediction error of each block is supplied to the addition circuit 226.

In the motion compensation circuit 223, on the basis of image data of a reference picture stored in the memory 229, a motion compensated compensation reference block for intra-layer compensation is obtained. Here, motion compensation is performed by using a motion vector included as MB header information.

In the inter-layer compensation circuit 224, a compensation reference block for inter-layer compensation is obtained that is motion-compensated on the basis of output of the loop filter 205 or image data of a reference picture stored in the memory 216, and further multiplied by the prediction coefficient for reducing the prediction residue. Here, motion compensation is performed by using a motion vector included as MB header information.

In addition, as the prediction coefficient, the prediction coefficient "Coef_i" is used corresponding to the "id" of the prediction coefficient included as MB header information. At this time, the relationship is referenced between the "id" of the prediction coefficient defined in the layer prediction mapping SEI (see FIG. 8(*a*)) or the layer prediction mapping descriptor (see FIG. 9(*a*)), and the prediction coefficient "Coef_i" identified by the "id".

In the switching circuit 225, when a target of the base stream referenced in inter-layer compensation is an image of the base stream processed at the same time as a picture of an enhanced layer, output of the loop filter 204 is selected. On the other hand, in the switching circuit 225, when the target of the base stream referenced in inter-layer compensation is an image of the base stream of past or future in display order, output of the memory 216 is selected. Here, switching is performed in accordance with information of an MB header.

Figure 13:
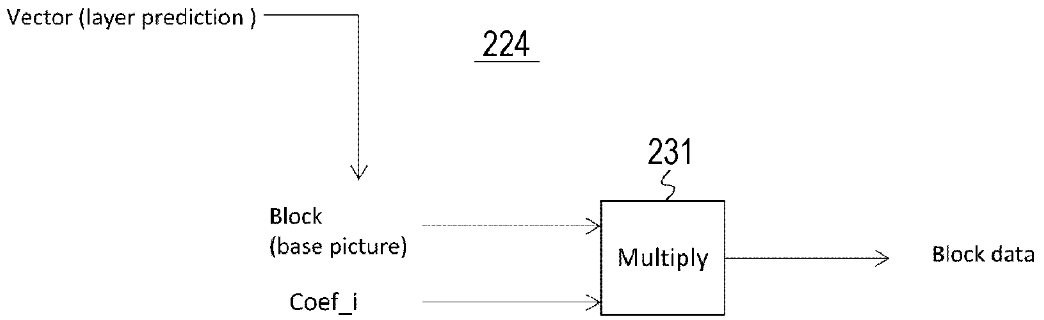
FIG. 13 is a block diagram showing a detailed example configuration of an inter-layer compensation circuit.

FIG. 13 shows a further detailed example configuration of the inter-layer compensation circuit 224. The inter-layer compensation circuit 224 includes a multiplication unit 231. In the multiplication unit 231, a motion compensated prediction reference block of the base layer is multiplied by the prediction coefficient "Coef_i", and a compensation reference block for inter-layer compensation is obtained.

Referring back to FIG. 12, the compensation reference block for intra-layer compensation obtained by the motion compensation circuit 223, or the compensation reference block for inter-layer compensation obtained by the inter-layer compensation circuit 224 is selected in units of the block by the switching circuit 227 and supplied to the addition circuit 226. Here, switching is performed in accordance with information of an MB header.

In the addition circuit 226, the compensation reference block is added to the prediction residue, and a block is obtained configuring the high frame rate enhanced frame image data Qe. After reduction of quantization noise by the loop filter 228, the block obtained by the addition circuit 226 in this way is stored in the memory 229. Then, by reading of stored data from the memory 229, the high frame rate enhanced frame image data Qe is obtained.

Referring back to FIG. 11, the postprocessor 204 performs inverse processing of the processing of the preprocessor 101 in the transmission device 100 to the base frame rate image data Qb and the high frame rate enhanced frame image data Qe obtained by the decoder 203, to obtain the 120 fps image data P'.

Figure 14:
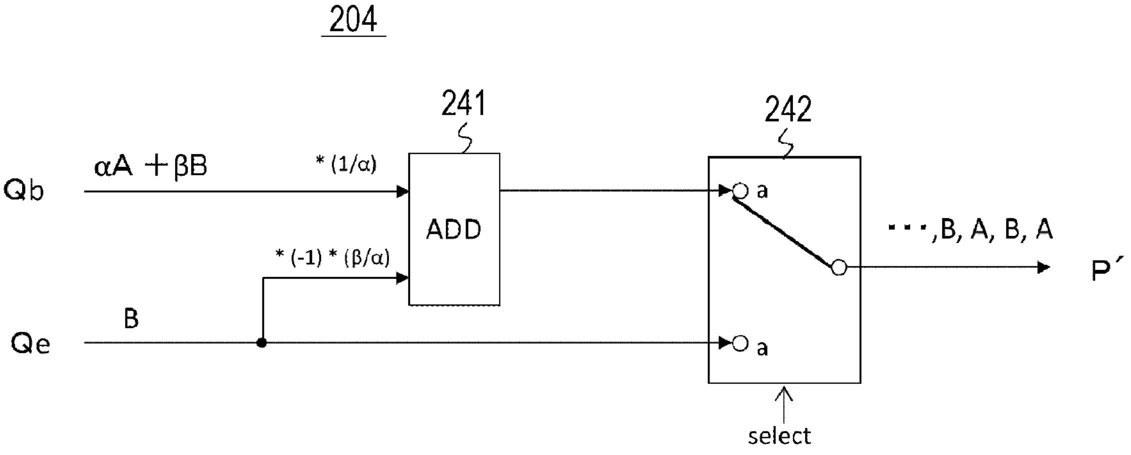
FIG. 14 is a block diagram showing an example configuration of the postprocessor configuring the reception device.

FIG. 14 shows an example configuration of the postprocessor 204. The postprocessor 204 includes an arithmetic circuit 241 and a switch circuit 242. The base frame rate image data Qb is input to the arithmetic circuit 241 with a gain of a "reciprocal of $\alpha$ ($1/\alpha$)". In addition, the high frame rate enhanced frame image data Qe is input to the arithmetic circuit 241 with a gain of "$(-1)*(\beta/\alpha)$", and a value of the Qe is input as it is to a fixed terminal of the b side of the switch circuit 242.

In the arithmetic circuit 241, inverse mixing processing is performed. Output of the arithmetic circuit 241 is input to a fixed terminal of the a side of the switch circuit 242 with a gain of the output as it is. The switch circuit 242 is alternately switched to the a side or b side at a cycle of 120 Hz. From the switch circuit 242, the 120 fps image data P' is obtained.

FIGS. 5(*b*) and 5(*c*) schematically show an example of a relationship between input data of the postprocessor 204 (image data Qb and Qe), and output data of the postprocessor 204 (image data P'). Corresponding to image data of each picture of the image data Qb, F1',F3',F5',F7', . . . , and image data of each picture of the image data Qe, F2, F4, F6, F8, . . . , image data of each picture of the image data P', F1, F2, F3, F4, F5, F6, F7, F8, . . . , are obtained.

Referring back to FIG. 11, the display processor 205 performs interpolation processing in the time direction, that is, frame interpolation processing to the 120 fps image data P obtained by the postprocessor 204, as necessary, to obtain image data of a higher frame rate than 120 fps, and supply the image data to a display unit.

Operation of the reception device 200 shown in FIG. 11 will be briefly described. In the reception unit 201, the RF modulation signal received by the receiving antenna is demodulated, and the transport stream TS is acquired. The transport stream TS is transmitted to the demultiplexer 202. In the demultiplexer 202, the base stream and the enhanced stream are extracted by filtering of the PID, from the transport stream TS, and supplied to the decoder 203.

In addition, in the demultiplexer 202, the section information included in the layer of the transport stream TS is extracted, and transmitted to the control unit (not shown). In this case, the layer prediction mapping descriptor (see FIG. 9(*a*)) is also extracted. With this arrangement, in the control unit, the relationship is recognized between the "id" of the prediction coefficient and the prediction coefficient "Coef_i" identified by the "id".

In the decoder 203, decoding processing is performed to the base stream and the base frame rate image data Qb is obtained, and decoding processing is performed to the enhanced stream and the high frame rate enhanced frame image data Qe is obtained. These image data Qb and Qe are supplied to the postprocessor 204.

In addition, in the decoder 203, the parameter set and the SEI inserted into each access unit configuring the base stream and the enhanced stream are extracted, and transmitted to the control unit (not shown). In this case, the layer prediction mapping SEI (see FIG. 8(*a*)) is also extracted. With this arrangement, in the control unit, the relationship is recognized between the "id" of the prediction coefficient and the prediction coefficient "Coef_i" identified by the "id".

In the decoder 203, when compensation is performed using the image data Qb of the base layer in obtaining the image data Qe of the enhanced layer, the image data Qb of the base layer is multiplied by the prediction coefficient for reducing the prediction residue. As the prediction coefficient in this case, the prediction coefficient "Coef_i" is used corresponding to the "id" of the prediction coefficient included as MB header information. At this time, the relationship is referenced between the "id" of the above-described prediction coefficient and the prediction coefficient "Coef_i" identified by the "id".

In the postprocessor 204, the inverse processing of the processing of the preprocessor 101 in the transmission device 100 is performed to the base frame rate image data Qb and the high frame rate enhanced frame image data Qe obtained by the decoder 203, and the 120 fps image data P is obtained.

The image data P obtained by the postprocessor 204 is supplied to the display processor 205. In the display processor 205, interpolation processing in the time direction, that is, frame interpolation processing is performed to the image data P, as necessary, and the image data is obtained of the frame rate higher than 120 fps. The image data is supplied to the display unit, and image display is performed.

Figure 15:
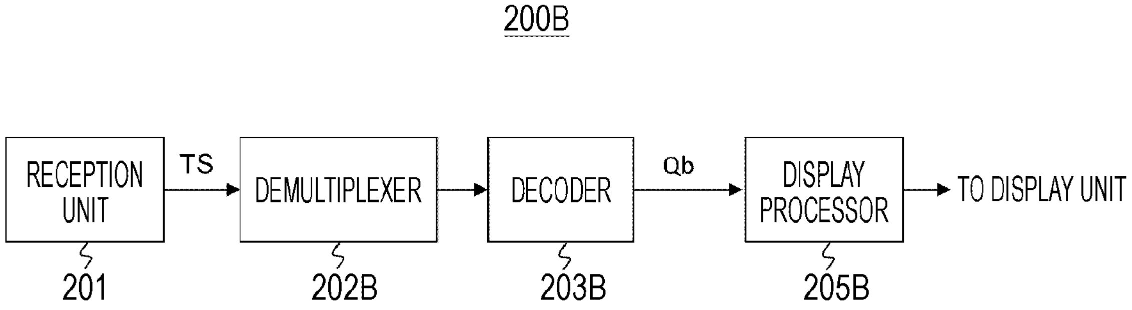
FIG. 15 is a block diagram showing an example configuration of the reception device (adaptable to a normal frame rate).

FIG. 15 shows an example configuration of the reception device 200B having decoding capability capable of processing 60 fps moving image data. In FIG. 15, components equivalent to components shown in FIG. 11 are denoted by the same reference numerals as those used in FIG. 11, and detailed explanation of them is not repeated herein. The reception device 200B includes the reception unit 201, a demultiplexer 202B, a decoder 203B, and a display processor 205B.

In the reception unit 201, the RF modulation signal received by the receiving antenna is demodulated, and the transport stream TS is acquired. In the demultiplexer 202B, only the base stream is extracted by filtering of the PID, from the transport stream TS, and supplied to the decoder 203B.

In the decoder 203B, decoding processing is performed to the base stream, and the base frame rate image data Qb is obtained. In the display processor 205B, interpolation processing in the time direction, that is, frame interpolation processing is performed to 60 fps image data Qb, and image data is obtained of a higher frame rate than 60 fps. The image data is supplied to the display unit, and image display is performed.

As described above, in the transmission/reception system 10 shown in FIG. 1, mixing processing is performed in units of two temporally consecutive pictures in the 120 fps image data P, and the 60 fps base frame rate image data Qb is obtained, and the base stream is transmitted obtained by performing prediction encoding processing to the base frame rate image data. For that reason, for example, in the reception side, in a case where there is decoding capability capable of processing the base frame rate image data, by processing the base stream to obtain the base frame rate image data, a smooth image can be displayed as a moving image, and it is possible to avoid that an image quality problem is caused due to frame interpolation processing by low load calculation in display processing.

In addition, in the transmission/reception system 10 shown in FIG. 1, the image data of one picture is extracted in units of two temporally consecutive pictures in the 120 fps image data P, and the high frame rate enhanced frame image data Qe is obtained, and the enhanced stream is transmitted obtained by performing, to the image data Qe, prediction encoding processing with respect to the base frame rate image data Qb. In this case, the base frame rate image data Qb is obtained by performing mixing processing in units of the two temporally consecutive pictures, so that the prediction residue is reduced, prediction efficiency is improved, and the amount of information data of the enhanced stream can be reduced.

FIG. 16 comparatively shows examples of (1) a prediction residue in a case where mixing processing is not performed, and (2) a prediction residue in a case where mixing processing is performed, using an example in a case where a coefficient of mixing processing is $\alpha=\frac{1}{2}$ (accordingly, $\beta=\frac{1}{2}$). In (1) and (2), "A" and "B" respectively correspond to "A" and "B" shown in the example configuration of the preprocessor 101 of FIG. 4. Incidentally, in this example, for simplicity, the block of a unit of processing is a 4×4 block. The unit of processing is not limited to the 4×4 block, and may be a greater block than the 4×4 block. This also applies to the following examples. As shown in the figure, it can be seen that the prediction residue in the case where mixing processing is performed is smaller than the prediction residue in the case where mixing processing is not performed.

FIG. 17 shows (1) an application example of inter-layer compensation of a decoder side, and (2) an example of decoder post processing (inverse mixing processing), in the case where mixing processing is performed. In (1) and (2), "A" and "B" respectively correspond to "A" and "B" shown in the example configuration of the postprocessor 204 of FIG. 14.

In addition, in the transmission/reception system 10 shown in FIG. 1, when prediction encoding processing with respect to the base frame rate image data Qb is performed to the high frame rate enhanced frame image data Qe, and the enhanced stream is obtained, the base frame rate image data Qb is multiplied by the prediction coefficient for reducing the prediction residue. For that reason, prediction efficiency can be improved, and the amount of information data of the enhanced stream can be further reduced.

FIG. 18 comparatively shows (1) a prediction residue in a case where mixing processing is not performed, and (2) a prediction residue in a case where mixing processing is performed, and a prediction coefficient is not multiplied (same as a case where a prediction coefficient "1" is multiplied). In (1) and (2), "A" and "B" respectively correspond to "A" and "B" shown in the example configuration of the preprocessor 101 of FIG. 4. In (2), the prediction residue is reduced by performing mixing processing.

FIG. 19 comparatively shows (1) the prediction residue in the case where mixing processing is performed, and the prediction coefficient is not multiplied (same as the case where the prediction coefficient "1" is multiplied), and (2) a prediction residue in a case where mixing processing is performed, and the prediction coefficient is multiplied. In (1) and (2), "A" and "B" respectively correspond to "A" and "B" shown in the example configuration of the preprocessor 101 of FIG. 4. In (2), the prediction residue is reduced by performing mixing processing, and the prediction residue is reduced by multiplying the prediction coefficient "2". In the decoder side, by using the same prediction coefficient as the prediction coefficient of the encoder, in inter-layer compensation, decoding is possible with a correct pixel value.

FIG. 20 shows (1) an application example of inter-layer compensation of the decoder side, and (2) an example of decoder post processing (inverse mixing processing), in the case where mixing processing is performed, and the prediction coefficient is multiplied. In (1) and (2), "A" and "B" respectively correspond to "A" and "B" shown in the example configuration of the postprocessor 204 of FIG. 14.

In addition, in the transmission/reception system 10 shown in FIG. 1, the prediction coefficient is defined in the layer of the enhanced stream and/or the layer of the transport stream TS as the container. For that reason, in the reception side, decoding processing for the enhanced stream can be appropriately performed using the prediction coefficient defined.

2. Modification

Incidentally, in the above-described embodiment, an example has been shown in which the overall frame rate is 120 fps and the base frame rate is 60 fps; however, a combination of the frame rates is not limited thereto. For example, a combination of 100 fps and 50 fps is similarly applied.

In addition, in the above-described embodiment, the transmission/reception system 10 including the transmission device 100 and the reception device 200 has been shown; however, a configuration of the transmission/reception system to which the present technology can be applied is not limited thereto. For example, the reception device 200 may have, for example, a configuration of a set top box and a monitor connected together via a digital interface such as High-Definition Multimedia Interface (HDMI), or the like. Incidentally, "HDMI" is a registered trademark.

In addition, in the above-described embodiment, an example has been shown in which the container is the transport stream (MPEG-2 TS). However, the present technology can also be applied similarly to a system with a configuration in which distribution to a reception terminal is performed using a network such as the Internet. In the distribution via the Internet, distribution is often performed with an MP4 or another format container. That is, the container includes containers of various formats, such as MPEG Media Transport (MMT) or a transport stream (MPEG-2 TS) adopted in the digital broadcasting standard, and ISOBMFF (MP4) used in Internet distribution.

In addition, the present technology may also be embodied in the configurations described below.

(1) A transmission device including:

an image processing unit that performs mixing processing in units of two temporally consecutive pictures in predetermined frame rate image data to obtain base frame rate image data, and extracts image data of one picture in units of the two temporally consecutive pictures to obtain high frame rate enhanced frame image data;

an image encoding unit that performs prediction encoding processing of the base frame rate image data to the base frame rate image data to obtain a base stream, and performs prediction encoding processing with respect to the base frame rate image data to the high frame rate enhanced frame image data to obtain an enhanced stream; and a transmission unit that transmits a predetermined format container including the base stream and the enhanced stream.

(2) The transmission device according to the (1), in which the image encoding unit, when prediction encoding processing with respect to the base frame rate image data is performed to the high frame rate enhanced frame image data and enhanced stream is obtained, multiplies the base frame rate image data by a prediction coefficient for reducing a prediction residue.

(3) The transmission device according to the (2), further including an information definition unit that defines the prediction coefficient in a layer of the enhanced stream.

(4) The transmission device according to the (2) or (3), further including an information definition unit that defines the prediction coefficient in a layer of the container.

(5) A transmission method including:

an image processing step of performing mixing processing in units of two temporally consecutive pictures in predetermined frame rate image data to obtain base frame rate image data, and extracting image data of one picture in units of the two temporally consecutive pictures to obtain high frame rate enhanced frame image data;

an image encoding step of performing prediction encoding processing of the base frame rate image data to the base frame rate image data to obtain a base stream, and performing prediction encoding processing with respect to the base frame rate image data to the high frame rate enhanced frame image data to obtain an enhanced stream; and a transmission step of transmitting a predetermined format container including the base stream and the enhanced stream, by a transmission unit.

(6) A reception device including a reception unit that receives a predetermined format container including a base stream and an enhanced stream, in which:

the base stream is obtained by performing prediction encoding processing of base frame rate image data to the base frame rate image data obtained by performing mixing processing in units of two temporally consecutive pictures in predetermined frame rate image data; and the enhanced stream is obtained by performing prediction encoding processing with respect to the base frame rate image data to high frame rate enhanced frame image data obtained by extracting image data of one picture in units of the two temporally consecutive pictures, and the reception device further includes a processing unit that processes only the base stream to obtain the base frame rate image data, or processes both the base stream and the enhanced stream to obtain the predetermined frame rate image data.

(7) The reception device according to the (6), in which a prediction coefficient for reducing a prediction residue is defined in a layer of the enhanced stream and/or a layer of the container, and the processing unit, when the high frame rate enhanced frame image data is obtained, multiplies the base frame rate image data obtained by processing the base stream, by the prediction coefficient defined, to make reference image data.

(8) A reception method including a reception step of receiving a predetermined format container including a base stream and an enhanced stream, by a reception unit, in which:

the base stream is obtained by performing prediction encoding processing of base frame rate image data to the base frame rate image data obtained by performing mixing processing in units of two temporally consecutive pictures in predetermined frame rate image data; and the enhanced stream is obtained by performing prediction encoding processing with respect to the base frame rate image data to high frame rate enhanced frame image data obtained by extracting image data of one picture in units of the two temporally consecutive pictures, and the reception method further includes a processing step of processing only the base stream to obtain the base frame rate image data, or processing both the base stream and the enhanced stream to obtain the predetermined frame rate image data.

(9) A transmission device including an image processing unit that performs mixing processing in units of two temporally consecutive pictures in predetermined frame rate image data to obtain base frame rate image data, and extracts image data of one picture in units of the two temporally consecutive pictures to obtain high frame rate enhanced frame image data;

an image encoding unit that performs encoding processing to the base frame rate image data to obtain a base stream, and performs encoding processing to the high frame rate enhanced frame image data to obtain an enhanced stream; and a transmission unit that transmits a predetermined format container including the base stream and the enhanced stream.

(10) A reception device including a reception unit that receives a predetermined format container including a base stream and an enhanced stream, in which:

the base stream is obtained by performing encoding processing to base frame rate image data obtained by performing mixing processing in units of two temporally consecutive pictures in predetermined frame rate image data; and the enhanced stream is obtained by performing encoding processing to high frame rate enhanced frame image data obtained by extracting image data of one picture in units of the two temporally consecutive pictures, and the reception device further includes a processing unit that processes only the base stream to obtain the base frame rate image data, or processes both the base stream and the enhanced stream to obtain the predetermined frame rate image data.

(11) The reception device according to the (10), in which the processing unit performs, in a case where both the base stream and the enhanced stream are processed and the predetermined frame rate image data is obtained, processing that performs decoding processing to the base stream to obtain the base frame rate image data, and performs decoding processing to the enhanced stream to obtain image data of one picture in units of the two temporally consecutive pictures that are the high frame rate enhanced frame image data, processing that performs, to the base frame rate image data, inverse processing of the mixing processing using the high frame rate enhanced frame image data, to obtain image data of another picture in units of the two temporally consecutive pictures, and processing that synthesizes the image data of the one picture in units of the two temporally consecutive pictures and the image data of the other picture in units of the two temporally consecutive pictures to obtain the predetermined frame rate image data.

The main feature of the present technology is that the image data of one picture is extracted in units of two temporally consecutive pictures in the 120 fps image data, and the high frame rate enhanced frame image data is obtained, and the enhanced stream is transmitted obtained by performing, to the image data, prediction encoding processing with respect to the base frame rate image data obtained by performing mixing processing in units of the two temporally consecutive pictures, whereby the amount of information data of the enhanced stream can be reduced (see FIG. 4 and FIG. 6).

REFERENCE SIGNS LIST

10 Transmission/reception system
100 Transmission device
101 Preprocessor
102 Encoder
103 Multiplexer
104 Transmission unit
111 Delay circuit
112 Arithmetic circuit
113 Latch circuit
121 Blocking circuit
122 Subtraction circuit
123 Motion prediction/motion compensation circuit
124 Integer transform/quantization circuit
125 Inverse quantization/inverse integer transform circuit
126 Addition circuit
127 Loop filter
128 Memory
129 Entropy encoding circuit
131 Blocking circuit
132 Subtraction circuit
133 Motion prediction/motion compensation circuit
134 Inter-layer prediction/inter-layer compensation circuit
135, 136 Switching circuit
137 Integer transform/quantization circuit
138 Inverse quantization/inverse integer transform circuit
139 Addition circuit
141 Loop filter
142 Memory
143 Entropy encoding circuit
151 Multiplication unit
152 Subtraction unit
153 Decision logic unit
200A, 200B Reception device
201 Reception unit
202, 202B Demultiplexer
203, 203B Decoder
204 Postprocessor
205, 205B Display processor
211 Entropy decoding circuit
212 Inverse quantization/inverse integer transform circuit
213 Motion compensation circuit
214 Addition circuit
215 Loop filter
216 Memory
221 Entropy decoding circuit
222 Inverse quantization/inverse integer transform circuit
223 Motion compensation circuit
224 Inter-layer compensation circuit
225 Switching circuit
226 Addition circuit
227 Switching circuit
228 Loop filter
229 Memory
231 Multiplication unit
241 Arithmetic circuit
242 Switch circuit

The invention claimed is:

1. A transmission device comprising:

processing circuitry configured to:

perform mixing processing in units of two temporally consecutive pictures in high frame rate image data to obtain base frame rate image data such that each frame in the base frame rate image data has a length of two temporally consecutive pictures of the high frame rate image data, the base frame rate image data having a number of frames that is half of a number of frames of the high frame rate image data, extract image data of one picture in units of the two temporally consecutive pictures to obtain enhanced frame image data such that each frame in the enhanced frame image data has a length of two temporally consecutive pictures of the high frame rate image data, the enhanced frame image data having a number of frames that is half of the number of frames of the high frame rate image data, perform encoding processing to the base frame rate image data to obtain a base stream, and perform encoding processing to the enhanced frame image data to obtain an enhanced stream; and a transceiver configured to transmit the base stream and the enhanced stream.

2. The transmission device according to claim 1, wherein the processing circuitry is further configured to multiply the base frame rate image data based on a coefficient for reducing a prediction residue when encoding processing with respect to the base frame rate image data is performed to the enhanced frame image data and the enhanced stream is obtained.

3. The transmission device according to claim 2, wherein the processing circuitry is further configured to include the coefficient in a layer of the enhanced stream.

4. The transmission device according to claim 2, wherein the processing circuitry is further configured to transmit a descriptor in which the coefficient is defined.

5. A reception device comprising a receiver configured to receive a base stream and an enhanced stream, wherein:

the base stream includes base frame rate image data in which each frame in the base frame rate image data has a length of two temporally consecutive pictures of high frame rate image data, the base frame rate image data obtained by performing mixing processing in units of two temporally consecutive pictures in the high frame rate image data, the base frame rate image data having a number of frames that is half of a number of frames of the high frame rate image data, and the enhanced stream includes enhanced frame image data in which each frame in the enhanced frame image data has a length of two temporally consecutive pictures of the high frame rate image data, the enhanced frame image data obtained by extracting image data of one picture in units of the two temporally consecutive pictures in the high frame rate image data, the enhanced frame image data having a number of frames that is half of the number of frames of the high frame rate image data, and processing circuitry configured to process the base stream and the enhanced stream to obtain the high frame rate image data.

6. The reception device according to claim 5, the processing circuitry is further configured to:

perform decoding processing to the base stream to obtain the base frame rate image data, and perform decoding processing to the enhanced stream to obtain the enhanced frame image data, and process the base frame rate image data and the enhanced frame image data based on a coefficient for reducing a prediction residue, to obtain the high frame rate image data.

7. The reception device according to claim 6, wherein the processing circuitry is further configured to obtain the coefficient that is defined in a layer of the enhanced stream.

8. The reception device according to claim 6, the processing circuitry is configured to receive a descriptor in which the coefficient is defined.

9. The reception device according to claim 5, the processing circuitry is further configured to:

perform, to the base frame rate image data, inverse processing of the mixing processing using the enhanced frame image data to obtain the high frame rate image data.

10. A reception method performed in a reception device, the reception method comprising:

receiving, by a receiver of the reception device, a base stream and an enhanced stream, wherein:

the base stream includes base frame rate image data in which each frame in the base frame rate image data has a length of two temporally consecutive pictures of high frame rate image data, the base frame rate image data obtained by performing mixing processing in units of two temporally consecutive pictures in the high frame rate image data, the base frame rate image data having a number of frames that is half of a number of frames of the high frame rate image data, and the enhanced stream includes enhanced frame image data in which each frame in the enhanced frame image data has a length of two temporally consecutive pictures of the high frame rate image data, the enhanced frame image data obtained by extracting image data of one picture in units of the two temporally consecutive pictures in the high frame rate image data, the enhanced frame image data having a number of frames that is half of the number of frames of the high frame rate image data, and processing by processing circuitry of the reception device, the base stream and the enhanced stream to obtain the high frame rate image data.

11. The reception method according to claim 10, further comprising:

perform, by the processing circuitry of the reception device, decoding processing to the base stream to obtain the base frame rate image data;

performing, by the processing circuitry of the reception device, decoding processing to the enhanced stream to obtain the enhanced frame image data; and processing, by the processing circuitry of the reception device, the base frame rate image data and the enhanced frame image data based on a coefficient for reducing a prediction residue, to obtain the high frame rate image data.

12. The reception method according to claim 11, further comprising:

obtaining, by the processing circuitry of the reception device, the coefficient that is defined in a layer of the enhanced stream.

13. The reception method according to claim 11, further comprising:

receiving, by the processing circuitry of the reception device, a descriptor in which the coefficient is defined.

14. The reception method according to claim 10, further comprising:

performing, by the processing circuitry of the reception device, to the base frame rate image data, inverse processing of the mixing processing using the enhanced frame image data to obtain the high frame rate image data.

15. The reception device according to claim 5, wherein the processing circuitry is further configured to perform interpolation processing to the high frame rate image data to obtain image data having a higher frame rate than the high frame rate image data.

16. The reception method according to claim 10, further comprising:

performing, by the processing circuitry of the reception device, interpolation processing to the high frame rate image data to obtain image data having a higher frame rate than the high frame rate image data.

* * * * *